US010332113B2

(12) United States Patent
Hanna et al.

(10) Patent No.: US 10,332,113 B2
(45) Date of Patent: Jun. 25, 2019

(54) MODEL-BASED PREDICTION OF AN OPTIMAL CONVENIENCE METRIC FOR AUTHORIZING TRANSACTIONS

(71) Applicant: EyeLock LLC, New York, NY (US)

(72) Inventors: Keith Hanna, Bronxville, NY (US); Mikhail Teverovskiy, White Plains, NY (US); Manoj Aggarwal, Lawrenceville, NJ (US); Sarvesh Makthal, Dobbs Ferry, NY (US)

(73) Assignee: Eyelock LLC, New York, NY (US)

( * ) Notice: Subject to any disclaimer, the term of this patent is extended or adjusted under 35 U.S.C. 154(b) by 651 days.

(21) Appl. No.: 14/945,023

(22) Filed: Nov. 18, 2015

(65) Prior Publication Data

US 2016/0140567 A1 May 19, 2016

Related U.S. Application Data

(60) Provisional application No. 62/082,070, filed on Nov. 19, 2014.

(51) Int. Cl.
G06Q 20/20 (2012.01)
G06Q 20/40 (2012.01)
G06Q 20/32 (2012.01)

(52) U.S. Cl.
CPC ....... *G06Q 20/40145* (2013.01); *G06Q 20/20* (2013.01); *G06Q 20/32* (2013.01); *G06Q 20/401* (2013.01); *G06Q 20/4016* (2013.01)

(58) Field of Classification Search
CPC .... G06Q 20/20; G06Q 20/32; G06Q 20/4016; G06Q 20/40145; G06Q 20/401
See application file for complete search history.

(56) References Cited

U.S. PATENT DOCUMENTS 4,641,349 A    2/1987  Flom et al.
5,259,040 A   11/1993  Hanna
(Continued)

FOREIGN PATENT DOCUMENTS

JP     2013/0186851     9/2013
KR    1020140076082     6/2014
(Continued)

OTHER PUBLICATIONS

Segffah et al.: Usability measurement and metrics: A consolidated model, 2006, Software Qual J, 14, pp. 159-178. (Year: 2006).*
(Continued)

*Primary Examiner* — Bijendra K Shrestha
(74) *Attorney, Agent, or Firm* — Foley & Lardner LLP

(57) ABSTRACT

The present disclosure describes systems and methods for authorization. The method may include accessing, by an authorization engine for a transaction by a user, an activity pattern model of the user from a database. The activity pattern model of the user may be indicative of a geospatial behavior of the user over time. The authorization engine may determine a set of sensors available for facilitating the transaction, each of the sensors assigned with a usability value prior to the transaction. The authorization engine may access an activity pattern model of the sensors, the activity pattern model of the sensors indicative of geospatial characteristics of one or more of the sensors over time. The authorization engine may determine a convenience metric for each of a plurality of subsets of the sensors, using the activity pattern model of the user, the activity pattern model of the sensors, and usability values of corresponding sensors. Each of the plurality of subsets may include corresponding sensors that can be used in combination to facilitate the transaction. The authorization engine may select,
(Continued)

using the determined convenience metrics, a subset from the plurality of subsets to use for the transaction.

20 Claims, 14 Drawing Sheets

(56) References Cited

U.S. PATENT DOCUMENTS

| | | | |
|---|---|---|---|
| 5,291,560 A | | 3/1994 | Daugman |
| 5,488,675 A | | 1/1996 | Hanna |
| 5,572,596 A | | 11/1996 | Wildes et al. |
| 5,581,629 A | | 12/1996 | Hanna et al. |
| 5,613,012 A | * | 3/1997 | Hoffman ............... G06F 21/32 235/380 |
| 5,615,277 A | | 3/1997 | Hoffman |
| 5,724,262 A | * | 3/1998 | Ghahramani ....... G06F 11/3419 434/322 |
| 5,737,439 A | | 4/1998 | Lapsley et al. |
| 5,764,789 A | | 6/1998 | Pare et al. |
| 5,802,199 A | | 9/1998 | Pare et al. |
| 5,805,719 A | | 9/1998 | Pare et al. |
| 5,838,812 A | | 11/1998 | Pare et al. |
| 5,901,238 A | | 5/1999 | Matsushita |
| 5,953,440 A | | 9/1999 | Zhang et al. |
| 5,978,494 A | | 11/1999 | Zhang |
| 6,021,210 A | | 2/2000 | Camus et al. |
| 6,028,949 A | | 2/2000 | McKendall |
| 6,064,752 A | | 5/2000 | Rozmus et al. |
| 6,069,967 A | | 5/2000 | Rozmus et al. |
| 6,144,754 A | | 11/2000 | Okano et al. |
| 6,192,142 B1 | | 2/2001 | Pare et al. |
| 6,247,813 B1 | | 6/2001 | Kim et al. |
| 6,252,977 B1 | | 6/2001 | Salganicoff et al. |
| 6,289,113 B1 | | 9/2001 | McHugh et al. |
| 6,366,682 B1 | | 4/2002 | Hoffman et al. |
| 6,373,968 B2 | | 4/2002 | Okano et al. |
| 6,377,699 B1 | | 4/2002 | Musgrave et al. |
| 6,424,727 B1 | | 7/2002 | Musgrave et al. |
| 6,483,930 B1 | | 11/2002 | Musgrave et al. |
| 6,532,298 B1 | | 3/2003 | Cambier et al. |
| 6,542,624 B1 | | 4/2003 | Oda |
| 6,546,121 B1 | | 4/2003 | Oda |
| 6,594,376 B2 | | 7/2003 | Hoffman et al. |
| 6,594,377 B1 | | 7/2003 | Kim et al. |
| 6,652,099 B2 | | 11/2003 | Chae et al. |
| 6,700,998 B1 | | 3/2004 | Murata |
| 6,714,665 B1 | | 3/2004 | Hanna et al. |
| 6,760,467 B1 | | 7/2004 | Min et al. |
| 6,850,631 B1 | | 2/2005 | Oda et al. |
| 6,917,695 B2 | | 7/2005 | Teng et al. |
| 6,980,670 B1 | | 12/2005 | Hoffman et al. |
| 6,985,608 B2 | | 1/2006 | Hoffman et al. |
| 7,095,901 B2 | | 8/2006 | Lee et al. |
| 7,146,027 B2 | | 12/2006 | Kim et al. |
| 7,248,719 B2 | | 7/2007 | Hoffman et al. |
| 7,271,939 B2 | | 9/2007 | Kono |
| 7,385,626 B2 | | 6/2008 | Aggarwal et al. |
| 7,414,737 B2 | | 8/2008 | Cottard et al. |
| 7,418,115 B2 | | 8/2008 | Northcott et al. |
| 7,428,320 B2 | | 9/2008 | Northcott et al. |
| 7,542,590 B1 | | 6/2009 | Robinson et al. |
| 7,558,406 B1 | | 7/2009 | Robinson et al. |
| 7,558,407 B2 | | 7/2009 | Hoffman et al. |
| 7,574,021 B2 | | 8/2009 | Matey |
| 7,583,822 B2 | | 9/2009 | Guillemot et al. |
| 7,606,401 B2 | | 10/2009 | Hoffman et al. |
| 7,616,788 B2 | | 11/2009 | Hsieh et al. |
| 7,639,840 B2 | | 12/2009 | Hanna et al. |
| 7,693,307 B2 | | 4/2010 | Rieul et al. |
| 7,697,786 B2 | | 4/2010 | Camus et al. |
| 7,715,595 B2 | | 5/2010 | Kim et al. |
| 7,719,566 B2 | | 5/2010 | Guichard |
| 7,797,606 B2 | | 9/2010 | Chabanne |
| 7,869,627 B2 | | 1/2011 | Northcott et al. |
| 7,929,732 B2 | | 4/2011 | Bringer et al. |
| 7,978,883 B2 | | 7/2011 | Rouh et al. |
| 8,009,876 B2 | | 8/2011 | Kim et al. |
| 8,025,399 B2 | | 9/2011 | Northcott et al. |
| 8,092,021 B1 | | 1/2012 | Northcott et al. |
| 8,132,912 B1 | | 3/2012 | Northcott et al. |
| 8,170,295 B2 | | 5/2012 | Fujii et al. |
| 8,233,680 B2 | | 7/2012 | Bringer et al. |
| 8,243,133 B1 | | 8/2012 | Northcott et al. |
| 8,279,042 B2 | | 10/2012 | Beenau et al. |
| 8,317,325 B2 | | 11/2012 | Raguin et al. |
| 2003/0021495 A1 | * | 1/2003 | Cheng ............... G06K 9/00013 382/312 |
| 2003/0158815 A1 | | 8/2003 | Yoshida et al. |
| 2005/0084137 A1 | | 4/2005 | Kim et al. |
| 2006/0074986 A1 | | 4/2006 | Mallalieu et al. |
| 2007/0211922 A1 | | 9/2007 | Crowley et al. |
| 2009/0074256 A1 | | 3/2009 | Haddad |
| 2009/0097715 A1 | | 4/2009 | Cottard et al. |
| 2009/0161925 A1 | | 6/2009 | Cottard et al. |
| 2009/0231096 A1 | | 9/2009 | Bringer et al. |
| 2010/0021016 A1 | | 1/2010 | Cottard et al. |
| 2010/0074477 A1 | | 3/2010 | Fujii et al. |
| 2010/0127826 A1 | | 5/2010 | Saliba et al. |
| 2010/0138899 A1 | | 6/2010 | Yamamoto et al. |
| 2010/0246903 A1 | | 9/2010 | Cottard |
| 2010/0278394 A1 | | 11/2010 | Raguin et al. |
| 2010/0310070 A1 | | 12/2010 | Bringer et al. |
| 2011/0119111 A1 | * | 5/2011 | Hanna ............... G06Q 30/02 705/7.33 |
| 2011/0119141 A1 | * | 5/2011 | Hoyos ............... G06Q 20/20 705/17 |
| 2011/0158486 A1 | | 6/2011 | Bringer et al. |
| 2011/0194738 A1 | | 8/2011 | Choi et al. |
| 2011/0277518 A1 | | 11/2011 | Lais et al. |
| 2012/0240223 A1 | | 9/2012 | Tu |
| 2012/0257797 A1 | | 10/2012 | Leyvand et al. |
| 2012/0268241 A1 | * | 10/2012 | Hanna ............... G06F 21/32 340/5.52 |
| 2013/0085857 A1 | * | 4/2013 | Bax ............... G06Q 30/02 705/14.57 |
| 2014/0068783 A1 | | 3/2014 | Akselrod et al. |
| 2014/0379310 A1 | * | 12/2014 | Ramachandran .. G06Q 30/0202 703/2 |

FOREIGN PATENT DOCUMENTS

| | | | |
|---|---|---|---|
| WO | WO-2009000646 A1 * | 12/2008 | ............... G01K 1/08 |
| WO | WO-2009142879 A2 * | 11/2009 | ......... G06F 3/04883 |
| WO | WO-2010/062371 | 6/2010 | |
| WO | WO-2011/093538 | 8/2011 | |

OTHER PUBLICATIONS

Nielsen, Jacob: Usability 101: Introduction to Usability, Jan. 2012, pp. 1-6. (Year: 2012).*

Hussain et al.: Usability Metric for Mobile Application: A Goal Question Metric (GQM) Approach, Nov. 2008, Proceedings of iiWAS2008, pp. 567-570. (Year: 2008).*

Seffah et al.: Usability measurement and metrics: A consolidation model, 2006, Software Qual Journal, pp. 159-178. (Year: 2006).*

Engineering.nyu.edu: Intro to Sensors, Dec. 21, 2009, pp. 1-27. (Year: 2009).*

International Preliminary Report on Patentability on PCT/US2015/061357 dated Jun. 1, 2017.

B. Galvin, et al., Recovering Motion Fields: An Evaluation of Eight Optical Flow Algorithms, Proc. of the British Machine Vision Conf. (1998).

International Search Report & Written Opinion on PCT/US2015/061357 dated Feb. 29, 2016.

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

R. Kumar, et al., Direct recovery of shape from multiple views: a parallax based approach, 12th IAPR Int'l Conf. on Pattern Recognition.

(56) References Cited

OTHER PUBLICATIONS

R. P. Wildes, Iris Recognition: An Emerging Biometric Technology, Proc. IEEE 85(9) at pp. 1348-1363 (Sep. 1997).

* cited by examiner

MODEL-BASED PREDICTION OF AN OPTIMAL CONVENIENCE METRIC FOR AUTHORIZING TRANSACTIONS

RELATED APPLICATIONS

This application claims priority to and the benefit of U.S. Provisional Patent Application No. 62/082,070, filed Nov. 19, 2014. The entire contents of the foregoing are hereby incorporated herein by reference for all purposes.

FIELD OF THE DISCLOSURE

This disclosure generally relates to systems and methods for authorizing a transaction, including but not limited to systems and methods for predicting a convenience metric for authorizing a transaction.

BACKGROUND

The diversity and number of computing devices is increasing exponentially. For example, there are hand-held devices such as smart-phones and tablets, reading devices that can also be used for web purchases, and also traditional desk-bound computing platforms. Each of these platforms may have different hardware and software capabilities, which can be used to perform transactions. Some of these capabilities may provide s security measure for preventing fraud, for example. However, these capabilities and features can change rapidly from product release to product release. Some of these features may not be available all the time for any given transaction. For example, GPS (Global Positioning System) features of a device may not be available indoors. It is therefore difficult to rely on a single feature as a security measure for protecting the integrity of every transaction, or even a subset of transactions.

SUMMARY

Some embodiments of the present invention relate generally to apparatuses, systems and methods for prediction of an optimal convenience metric for authorizing transactions. Convenience to the user is becoming an important constraint in the performance of transactions. In some embodiments, a transaction may be a financial transaction at a point of sale, a logical transaction at a point of computer access, or may be any passive or active interaction of a user with one or more sensors where at least one attribute of the sensor, such as its identification number, is known. The sensor may be a biometric sensor such as an iris match device or fingerprint match device, or a Bluetooth low power proximity sensor, for example. Such passive or active transactions between users and sensors is becoming more prevalent due to the growth of the Internet of Things (IoT), which is the interconnection of uniquely identifiable embedded computing devices within the existing Internet infrastructure.

Deployment of biometric sensors and widespread adoption are sometimes limited due to usability, in which biometric acquisition systems may lack user-friendly design and proved difficult or inconvenient to use by a typical user. In some embodiments applied to financial transactions for example, it may be advantageous to determine an optimal convenience metric that optimizes or improves the likelihood of a user completing a transaction due to its convenience or usability while at the same time optimizing or improving the net expected monetary or other benefit to the system authorizing the transaction.

In some embodiments applied to Enterprise Resource Planning (ERP) or logical access applications for example, it may be an objective to determine an optimal convenience metric that optimizes or improves the user's time spent or effort while performing a transaction, while at the same time optimizing or improving the net potential monetary or other loss of assets to which the system is providing access by authorizing the transaction.

A method is described for predicting an optimal convenience metric used to authorize transactions. In some embodiments, the prediction of the optimal convenience metric is determined using prior transactions that may have been performed actively or passively at potentially different locations with different sensors, and using a model that may be based in part on an economic value of convenience.

In some embodiments relating to financial transactions for example, the optimal prediction of the convenience metric may correspond to maximizing the net expected monetary benefit that the system derives from a transaction.

In some embodiments relating to ERP or logical access applications for example, the optimal prediction of the convenience metric may correspond to minimizing the net potential monetary cost incurred by the system as a result of performing the transaction.

In one aspect, the present disclosure is directed to a method of authorization. The method may include accessing, by an authorization engine for a transaction by a user, an activity pattern model of the user from a database. The activity pattern model of the user may be indicative of a geospatial behavior of the user over time. The authorization engine may determine a set of sensors available for facilitating the transaction, each of the sensors assigned with a usability value prior to the transaction. The authorization engine may access an activity pattern model of the sensors, the activity pattern model of the sensors indicative of geospatial characteristics of one or more of the sensors over time. The authorization engine may determine a convenience metric for each of a plurality of subsets of the sensors, using the activity pattern model of the user, the activity pattern model of the sensors, and usability values of corresponding sensors. Each of the plurality of subsets may include corresponding sensors that can be used in combination to facilitate the transaction. The authorization engine may select, using the determined convenience metrics, a subset from the plurality of subsets to use for the transaction.

In some embodiments, the usability value of a corresponding sensor is indicative of an amount of user effort (e.g., measured in time) to provide input to the corresponding sensor (e.g., a correct or appropriate input to the sensor, and/or input that results in a correct or appropriate output response from the sensor). In certain embodiments, the selected subset of sensors includes a biometric sensor. In some embodiments, at least one of the activity pattern model of the user or the activity pattern model of the sensors includes a component that is dynamically updated (e.g., based on subsequent measurements obtained) during at least part of the transaction. In certain embodiments, at least one of the activity pattern model of the user or the activity pattern model of the sensors include at least one of: a sequence model, a velocity model, a periodic model, a habitat model, or a neural network model.

In some embodiments, the authorization engine determines the convenience metric for each of the plurality of subsets using outputs of at least one of the sensors obtained prior to the transaction. In certain embodiments, the authorization engine determines the convenience metric for each of the plurality of subsets using a device-specific metric of at least one of the sensors, the device-specific metric comprising a false accept rate, a false reject rate or quality of acquired biometrics. In some embodiments, the authorization engine determines the convenience metric for each of the plurality of subsets using outputs of at least one sensor different from sensors of the first set, obtained prior to the transaction. In certain embodiments, selecting the subset from the plurality of subsets to use for the transaction comprises: determining, by the authorization engine for each of the plurality of subsets using a corresponding convenience metric, an expected income from authorizing the transaction; and selecting, by the authorization engine, a subset from the plurality of subsets to use for the transaction, the selected subset determined with an expected income that is higher than that of others of the plurality of subsets of sensors. In some embodiments, the expected income incorporates at least one of: a benefit or income from a correct determination to authorize the transaction, a potential loss due to an incorrect determination to authorize the transaction, or an expected loss of income from losing the user as a customer.

In another aspect, this disclosure is directed to a system of authorization. The system may include a set of sensors available for facilitating a transaction by a user. A database may be configured to store at least one of an activity pattern model of the user and an activity pattern model of the sensors. An authorization engine may be configured to access, for a transaction, the activity pattern model of the user from the database. The activity pattern model of the user may be indicative of a geospatial behavior of the user over time. The authorization engine may be configured to determine the set of sensors available for facilitating the transaction, each of the sensors assigned with a usability value prior to the transaction. The authorization engine may be configured to access the activity pattern model of the sensors, the activity pattern model of the sensors indicative of geospatial characteristics of one or more of the sensors over time. The authorization engine may be configured to determine a convenience metric for each of a plurality of subsets of the sensors, using the activity pattern model of the user, the activity pattern model of the sensors, and usability values of corresponding sensors. Each of the plurality of subsets may include corresponding sensors that can be used in combination to facilitate the transaction. The authorization engine may be configured to select, using the determined convenience metrics, a subset from the plurality of subsets to use for the transaction.

In some embodiments, the usability value of a corresponding sensor is indicative of an amount of user effort to provide input to the corresponding sensor. In certain embodiments, the selected subset of sensors includes a biometric sensor. In some embodiments, at least one of the activity pattern model of the user or the activity pattern model of the sensors comprises a component that is dynamically updated during part of the transaction. In certain embodiments, at least one of the activity pattern model of the user or the activity pattern model of the sensors comprises at least one of: a sequence model, a velocity model, a periodic model, a habitat model, or a neural network model. In some embodiments, the authorization engine is configured to determine the convenience metric for each of the plurality of subsets using outputs of at least one of the sensors obtained prior to the transaction.

In some embodiments, the authorization engine is configured to determine the convenience metric for each of the plurality of subsets using a device-specific metric of at least one of the sensors, the device-specific metric comprising a false accept rate, a false reject rate or quality of acquired biometrics. In some embodiments, the authorization engine is configured to determine the convenience metric for each of the plurality of subsets using outputs of at least one sensor different from sensors of the first set, obtained prior to the transaction. In some embodiments, the authorization engine is configured to select the subset from the plurality of subsets to use for the transaction, comprising: determining, by the authorization engine for each of the plurality of subsets using a corresponding convenience metric, an expected income from authorizing the transaction; and selecting, by the authorization engine, a subset from the plurality of subsets to use for the transaction, the selected subset determined with an expected income that is higher than that of others of the plurality of subsets of sensors. In some embodiments, the expected income incorporates at least one of: a benefit or income from a correct determination to authorize the transaction, a potential loss due to an incorrect determination to authorize the transaction, or an expected loss of income from losing the user as a customer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan would understand that the drawings primarily are for illustration purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 10 depicts one embodiment of a relationship between total convenience metric and friction metric; and.

DETAILED DESCRIPTION

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for predicting an optimal convenience metric for authorizing transactions.

A. Network and Computing Environment

Figure 1A:
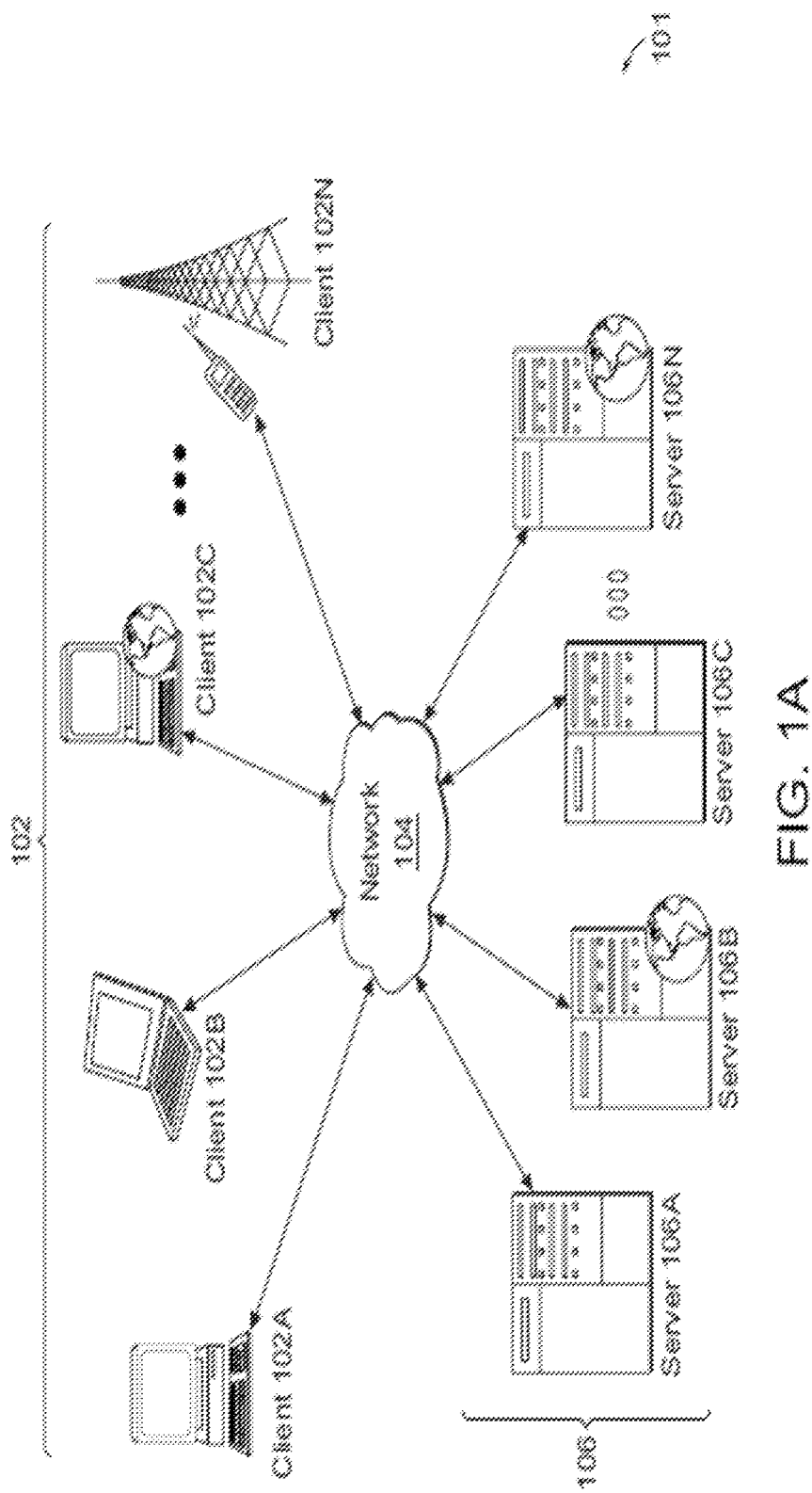
FIG. 1A is a block diagram illustrative of an embodiment of a networked environment with a client machine that communicates with a server.

Before addressing specific embodiments of the present solution, a description of system components and features suitable for use in the present systems and methods may be helpful. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
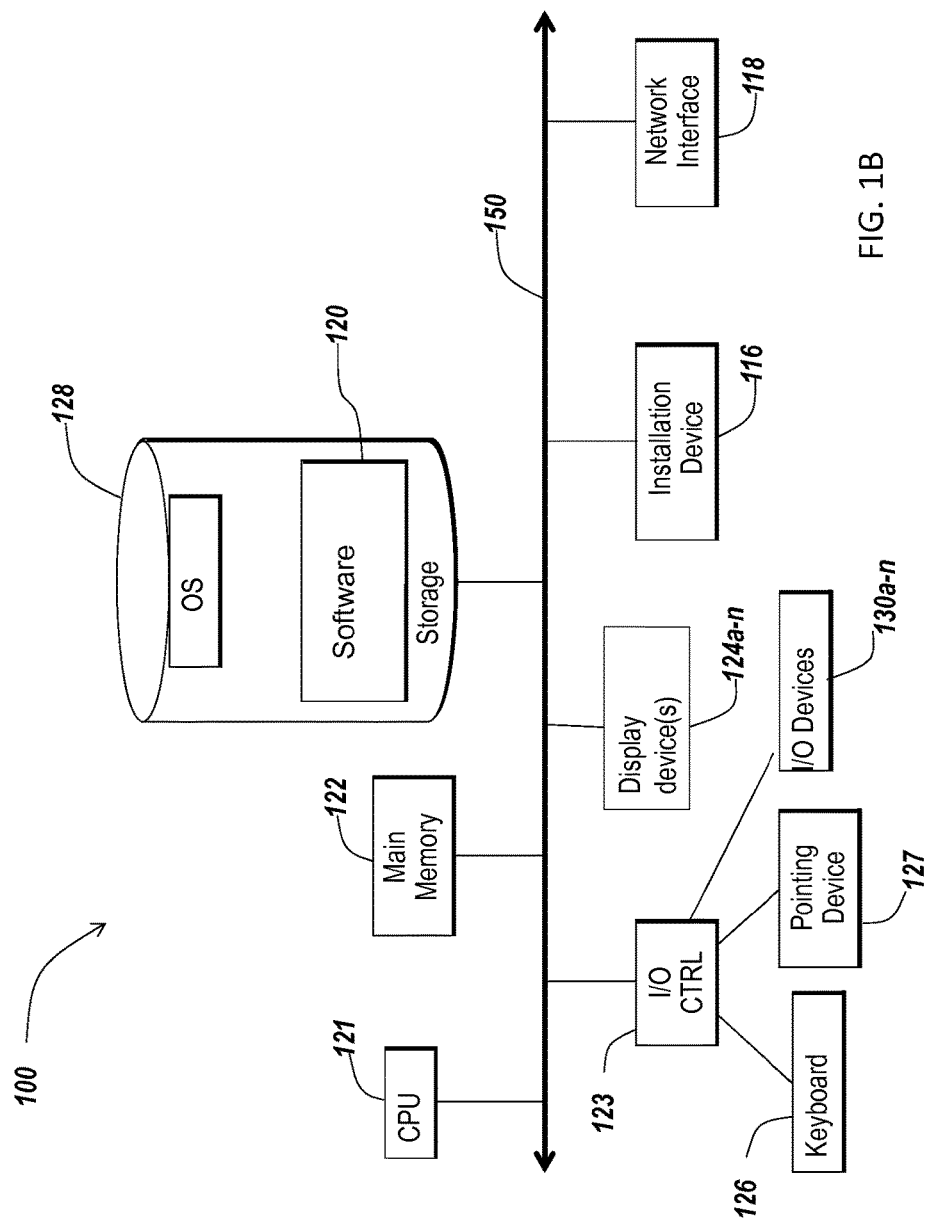
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, and software 120. The I/O controller 123, in some embodiments, is further connected to a key board 126, and a pointing device 127. Other embodiments may include an I/O controller 123 connected to more than one input/output device 130A-130N.

Figure 1C:
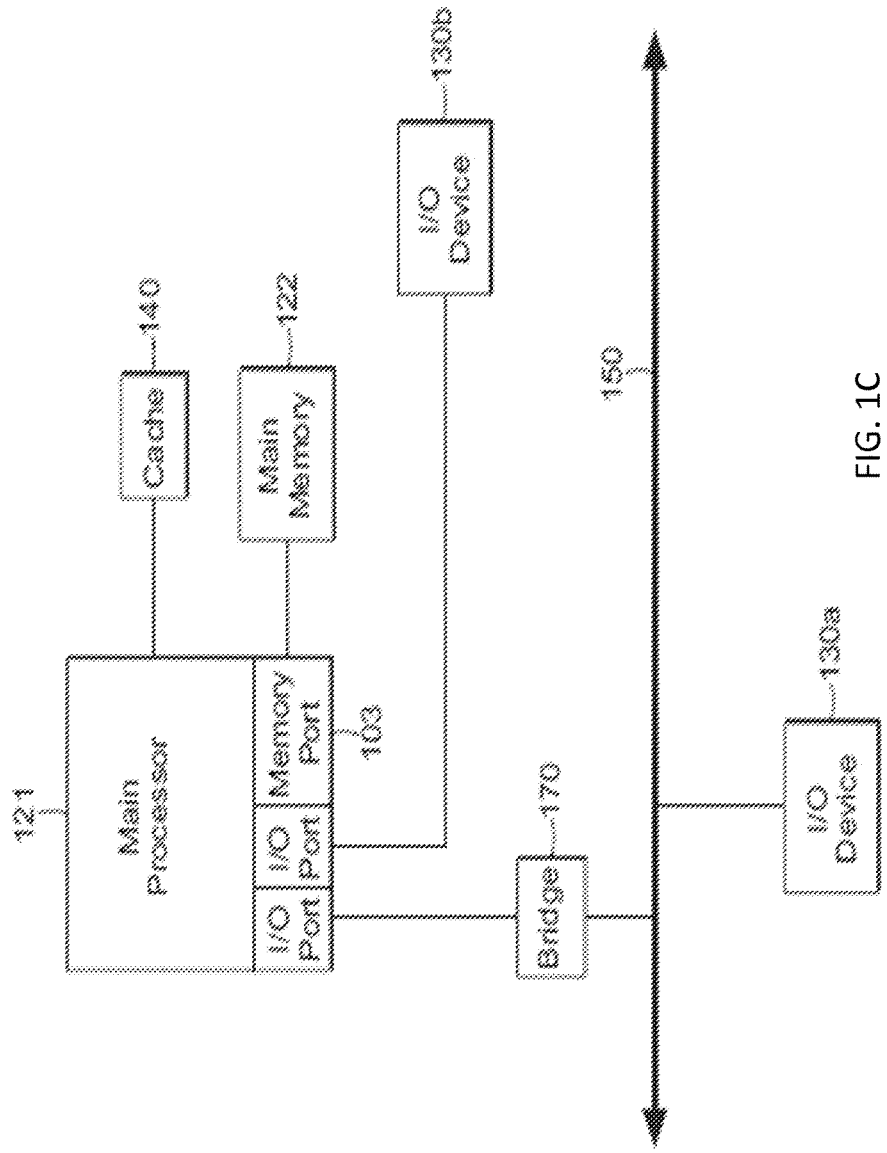

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

The computing device 100 can include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Prediction of an Optimal Convenience Metric

According to some embodiments, systems and methods for predicting a convenience metric for authorizing transactions are provided. The prediction of the convenience metric may be determined in part based on the activity pattern models of the user and activity pattern models of the sensors. To the extent that the models' predictions are consistent with a transaction's occurrence with respect to the user and sensor(s), the system may generate a convenience metric that corresponds to the system imposing the use of a convenient, small set of sensors to authorize a transaction for the user. On the other hand, to the extent that the system determines that the models' predictions are inconsistent with the transaction's occurrence with respect to the user and sensor(s), the system may generate a convenience metric that corresponds to imposing the use of a less convenient, potentially larger or different set of sensors in order to authorize the transaction.

Economic Model of Convenience

In some embodiments, an economic model of convenience is used. The system may determine an optimal convenience metric comprising a convenience metric that maximizes an expected net benefit, or minimizes an expected net cost, over (or using data from) a plurality of transactions of a user over time, to a system that supports or enables the plurality of transactions. In certain embodiments, the system may determine an optimal convenience metric comprising a convenience metric that maximizes an expected net benefit or minimizes an expected net cost arising from a transaction, and may use data from a plurality of transactions of a user over time. The term "optimal" or "optimized" may refer to an improved or preferred result or selection relative to one or more other results, selections or alternatives. This similarly applies to the terms "optimizing" and "optimize" for example.

In some embodiments, the economic model is such that the expected income J is defined as a difference between an expected revenue and expected expenses for one or more transactions, for example as shown in equation (1). An objective is to optimize economic income with respect to a convenience metric for a transaction in one or more embodiments. In some embodiments, the optimal economic income may correspond to the maximum economic income.

This model may be applicable for financial transactions performed on mobile devices or at points of sale, for example. In some embodiments, the revenue term of equation (1) quantifies the financial benefit to the system controlling the transaction of authorizing a particular transaction with the correct user, and the expenses term quantifies the potential financial loss of authorizing the transaction with the incorrect user for instance. In some embodiments, the expected income J may be represented as follows:

$$J=\$Revenue-\$Expenses \quad (1)$$

In certain embodiments, the model may be such that economic income is defined as a difference between a cost of performing the transaction and assets that may be lost as a result of the transaction, as shown in equation (2). This model may be applicable for logical access to computers, mobile devices or software applications for instance, where there may be no specific revenue associated with a transaction, and the goal may be to optimize, for example, cost of the user's effort (e.g., cost of the user's time) interacting with the sensors while still protecting the assets. Accordingly, in some embodiments, the expected income J may be represented as follows:

$$J=-\$Cost-\$Assets \quad (2)$$

Equation (2) shows that, in this embodiment, the expected income is negative for all positive values of the expected cost and expected loss of assets. In some embodiments, as in the prior embodiment, the optimal economic income may be the maximum economic income, which in this case corresponds to the minimum overall loss to the system controlling the authorization.

Activity Pattern Model of the User

Embodiments of the systems can include, use and/or maintain an activity pattern model of a user's extended geospatial path over time. According to some embodiments, the activity pattern model of the user can comprise in part a component that is pre-determined and based on the user's expected behavior, which may be predicted or determined based on past activity and/or measurements for instance. The activity pattern model of the user can comprise a component that is dynamic and updated based on current or subsequent measurements and/or activity that may include the positions of the user or sensors.

As used herein, the term "model" refers generally to a description or representation of a system and/or behavior. The description or representation of a model can use mathematical language, such as in the case of mathematical models. Examples of types of models and/or characteristics of models, without limitation, include: lookup tables, linear, non-linear, deterministic, probabilistic, static, dynamic models, and models having lumped parameters and/or distributed parameters.

According to some embodiments, an activity pattern model of a user (sometimes referred to as "user model") can be based in part on the geolocation of places that the user frequents. Geolocation can be expressed, for example, by geographical coordinates of latitude and longitude of a place, and/or may be expressed as a relative position between two users, or between a user and a given sensor. The activity pattern model of a user can be based in part on geolocation of one or more homes of the user. The user model can be based in part on geolocation of one or more workplaces of the user. The user model can be based on the geolocation of other places that the user frequents at particular times. The aforementioned data can be inputted into the system manually by the user or an operator or communicated by one or more sensors or tracking modules for example.

According to some embodiments, the activity pattern of the user can be based on means of travel or transportation available to the user at different locations, such as an aircraft, vehicle, bicycle, or walking. For example, at an airport location the user may have access to both an aircraft and a vehicle, while at a place of work the user may only move around by walking. The aforementioned data can be inputted into the system manually by the user or an operator, and/or communicated by one or more sensors or tracking modules for example.

According to some embodiments, the activity pattern model of a user can also be based in part on a schedule of the user. The schedule can include a company working schedule, a personal digital assistant (PDA) schedule, a company holiday schedule, a national holiday schedule, local school schedules, a schedule for being present at home, a fitness and/or shopping schedule, a schedule for being away from home, or specific scheduled meetings. The schedules can be inputted into the system manually by the user or an operator, and/or may in some embodiments be automatically downloaded from or synchronized with a calendar maintenance program such as Microsoft's Outlook Calendar.

According to some embodiments, the activity pattern model of a user can be based in part on a profile of the user. Possible profiles can include as examples a business person, a student or a homemaker. For example, a homemaker may spend most mornings at home, while a business person may spend most of the day away from home and at a workplace. The profile of the user can be inputted into the system manually by the user and/or an operator.

According to some embodiments, the activity pattern model of a user can be based in part on for example a sequence model, a velocity model, a habitat model, a periodic model, and/or a Neural Network model. For example, a sequence model may model a probability of a user being at a particular location of a second sensor after being at the position of a first sensor within a time period. The first and second sensors can be co-located or at different locations. A velocity model may model the expected potential velocity of the user at different locations, based on means of transportation available to them at that location for example, such as an aircraft or vehicle. A habitat model may model a probability that a user is in a particular place at a particular time, based on calendar information for example. A periodic model may model a probability that a user is in a particular place at a particular time in a pattern that is expected to repeat over time, for example the user's arrival at the user's office in the morning within a time interval or window during working hours.

Sensors

According to some embodiments, the system can also include sensors mounted either on static or on mobile devices. These devices can in turn be mounted on static or mobile structures, such as entrance gateways or transport vehicles. A user can interact passively or actively with one or more of the sensors in the course of performing a transaction.

As used herein the term "sensor" refers generally to a device or system that measures and/or registers a substance, physical phenomenon, physical quantity, location and/or time, etc. The sensor may convert a measurement into a signal, which can be interpreted by an observer, instrument and/or system. A sensor can be implemented as a special purpose device and/or can be implemented as software running on a general-purpose computer system.

Sensors can include one or more of an iris match system or device using infra-red or visible illumination, whereby a user presents the user's iris and the iris match system or device compares the iris (or a representation of the iris) to a representation of a previously stored iris and outputs a match score or decision metric. Sensors can include a fingerprint match module whereby a user presents the user's fingerprint and the fingerprint match module compares the fingerprint (or a representation of the fingerprint) to a representation of a previously-stored fingerprint and outputs a match score or decision metric. Sensors can include a palm vein/print match module whereby the user presents the user's palm and the module compares the representation of the palm to a representation of a previously-stored palm vein/print pattern and outputs a match score or decision metric. Sensors can include a face recognition match module whereby a user presents the user's face and the module compares a representation of the face to a representation of a previously-stored face and outputs a match score or decision metric. Sensors can include an eye match module using blood vessel patterns in the sclera or patterns in the periocular region whereby the user presents the user's eye-based patterns and the module compares one or more of the blood vessel or periocular patterns to a representation of previously-stored patterns and outputs a match score or decision metric. Sensors can include a voice recognition module whereby a signal corresponding to a user's voice is acquired and compared to a signal corresponding to the voice of the user recorded previously, and outputs a match score or decision metric.

The sensors can also include one or more of a heart-beat pattern match module whereby the user's heart beat pattern is measured using a wrist-mounted or other sensor and the module compares it to a representation of a previously-stored heart-beat pattern and outputs a match score or decision metric, a microsaccades sensor that detects movement in a user's eye and compares the detected movement with a representation of a previously-stored movement pattern, a liveness detection module that detects measures of liveness of the user such as eye-blinks or motion of the chest due to breathing and outputs a match score or decision metric. The sensors can include a deterrent module comprising a camera and processor that detects the presence of a face in the camera's field of view, records the image for subsequent evidentiary use in the case of a reported fraudulent transaction, and may quantify the effectiveness of the deterrent based on the resolution of the image determined by the number of pixels between the eyes of the user for instance, and outputs a match score or decision metric. Some of these sensors provide a probability of correct identification or authentication not by direct measurement of a user's characteristics, but by exploiting indirect correlation of sensor output or signal with a correct identification of a user that may have been determined empirically. For example, in some embodiments of a deterrent sensor, it may be more likely that a correct user would comply with the sensor and enable the acquisition and storage of image data of sufficient quality for subsequent evidentiary use, compared to an incorrect or fraudulent user.

The sensors can include one or more of a mobile phone identification (ID) detection module that compares an ID of the mobile phone to a previously-stored ID and outputs a match score or decision metric, a device identification (ID) module that compares the ID of the device to a previously-stored ID and outputs a match score or decision metric, a Bluetooth proximity module that outputs a metric correlated to the range between two Bluetooth devices that may include a "near", "far", or "intermediate" range as in the Bluetooth protocol, a Near Field Communications (NFC) proximity module that outputs a range or decision metric based at least on range, a Global Positioning System (GPS) location module that outputs geo-coordinates of the module, or a wired or wireless network geolocation detection module that looks up a pre-determined geolocation of one or more routers or cell towers based on the detection of the identification number of the routers or cell-towers to which a device is connected, and may compute the geo-coordinates of the device based on triangulation of the signals to the routers or cell-towers, and outputs geo-coordinates of the module.

The sensors can include a password module that may comprise software executing on a device that allows a user to enter a password manually and whereby the module compares the password to a pre-entered or pre-determined password, and outputs a match score or decision metric. The sensors can include a Know-Your-Customer (KYC) module whereby a KYC module can comprise software executing on a device that prompts the user with pre-entered or pre-determined questions, allows the user to enter an answer to one or more of the questions, compares the user's answers to the questions to pre-entered or pre-determined answers and outputs a match score or decision metric. The sensors can include a card swipe device capable of reading a card number from a smart card or magnetic stripe card swiped by the user, and the module compares the card number to a pre-entered or pre-determined card number.

Activity Pattern Model of the Sensors

The systems can include an activity pattern model of one or more sensors' extended geospatial paths over time. Although sometimes generally referred to as an activity pattern model of sensors, such a model may comprise a model based on one sensor or a plurality of sensors, and may comprise a plurality or collection of models each of one or more sensors. For example, an activity pattern model of multiple sensors may incorporate activity pattern models of each of the sensors. In some embodiments, an activity pattern model of multiple sensors may include information about how two or more of the sensors interact with each other, and/or how two or more of the sensors are related to each other.

According to some embodiments, the activity pattern model of the sensors can comprise in part a component that is pre-determined based on the known location of sensors with respect to each other or the user. The activity pattern model of the sensors can comprise in part a component that is dynamic and updated based in part on subsequent measurements of sensor and/or user positions.

As used herein the term "model" refers generally to a description or representation of a system or behavior. The description or representation can use mathematical language, such as in the case of mathematical models. Examples of types of models and/or characteristics of models, without limitation, include: lookup tables, linear, non-linear, deterministic, probabilistic, static, dynamic models, and models having lumped parameters and/or distributed parameters.

According to some embodiments, the activity pattern model of the sensors can be based in part on the absolute or relative spatial or temporal positions of static and/or dynamic sensors. For example, spatial position may be expressed either by the geographical latitude and longitude of the geolocation of a sensor with a given identification number (ID) or the relative position of the sensor with respect to a reference point or another sensor). The temporal position of one sensor to the next may be the time a user is expected to take to move from one sensor to the other using means of travel or transportation available to the user at different locations, such as an aircraft, vehicle, bicycle, or walking. The sensor model can be based in part on a temporal schedule. For example, a GPS sensor may be embedded within a mobile phone device, and the user may be at the same location as the phone during working hours. The geolocations of the sensors may be entered manually by a user and/or operator, or may be computed or determined automatically by a GPS module mounted on or coupled to the sensor, or may be computed or determined by a wired or wireless network geolocation detection module mounted on the sensor that looks up a pre-determined geolocation of one or more routers or cell towers based on the detection of the identification number of the routers or cell-towers to which a device is connected, and may compute or determine the geo-coordinates of the sensor based on triangulation of the signals to the routers or cell-towers, and outputs geo-coordinates of the sensor.

According to some embodiments, the activity pattern model of sensors can be based in part on parameters related to a mobile phone. The parameters may include an identifier or ID (e.g., identifying number) of a user registered to a mobile phone, an ID of a subscription holder of the mobile phone, an ID of a user signed in with the mobile phone, a home address of the user registered to the mobile phone, and/or a work address of the user of the phone, as examples.

According to some embodiments, the activity pattern model of the sensors can be based in part on a sequence model, a velocity model, a habitat model, a periodic model, or a Neural Network model. In some cases the sensors may be statically mounted to building infrastructures and the key aspect of their model may be simply their positions and/or their positions with respect to each other. In certain cases however, sensors may be mounted within moving objects such as vehicles, mobile phones, trains, or laptops.

For example, a sequence model may model the probability that a position of a sensor mounted on a user's vehicle that moves from a location of the user's home to a location of the user's workplace within a time period. A velocity model may model an expected potential velocity of the sensor at different locations, for example the sensor mounted in a vehicle may of course travel at vehicular speeds. A habitat model may model the probability that a sensor is in a particular place at a particular time, based for example on associations with the user, for example a sensor on a laptop may share the same habitat as its registered user. A periodic model may model the probability that a sensor is in a particular place at a particular time in a pattern that is expected to repeat over time, for example the position of the aforementioned sensor in the user's vehicle may change each work day periodically from the position of the user's home to the position of the user's workplace.

Prediction of Convenience Metric

Some embodiments of the system include a method for predicting a convenience metric. According to some embodiments, the method includes one or more algorithms for predicting a convenience metric based on one or more user and/or sensor activity patterns (or models). The prediction of the convenience metric may be based on a maximum-likelihood approach.

According to some embodiments, the method can include determining a first set of sensors that is available for a first transaction. The determination may comprise interrogating a device such as a mobile phone or software application on a host device, and determining the set of sensors that is available and expected to be operational at the time of the first transaction.

According to some embodiments, the method can include determining an individual convenience metric for each sensor in the first set based on sensor usability parameters that are pre-determined prior to the time of the first transaction. An individual convenience metric of a sensor is sometimes referred to as a usability value or usability metric. In some embodiments, a usability value of a corresponding sensor is indicative of an amount of user effort (e.g., time and/or steps) to provide an input to the corresponding sensor (e.g., that allows or results in a correct or appropriate output). The usability parameters may be based on the expected time and/or number of steps (e.g., expected effort) it takes for a user to use a sensor (e.g., successfully provide usable or good quality input or measurement to the sensor).

According to some embodiments, the method can include determining a prediction of a total convenience metric (sometimes simply referred to as "convenience metric") for the first transaction based on the activity pattern models of the user and/or the sensors, the individual convenience metrics of a subset of the first set of sensors, and the outputs of at least one second set of one or more sensors acquired prior to the time of the first transaction. According to some embodiments, the subset of the first set of sensors may be the same as the set of the first set of sensors. According to some embodiments, the first set of sensors may be different to the second set of sensors. According to some embodiments, the first set of sensors may be the same as the second set of sensors.

According to some embodiments, the method can include determining an optimal total convenience metric for the first transaction using at least the prediction of the total convenience metric. According to some embodiments, the method can include selecting or choosing an optimal subset of the first set of sensors for the first transaction based on the optimal total convenience metric. According to some embodiments, the method can include selecting or choosing an optimal subset of the first set of sensors, from a plurality of possible subsets of sensors of the first set of sensors, for the first transaction, that corresponds to the optimal total convenience metric. According to some embodiments, the method can include acquiring sensor data from the optimal subset of the first set of sensors for the first transaction. According to some embodiments, the method can include authorizing the transaction based on at least the prediction of the total convenience metric and the acquired sensor data.

Figure 2A:
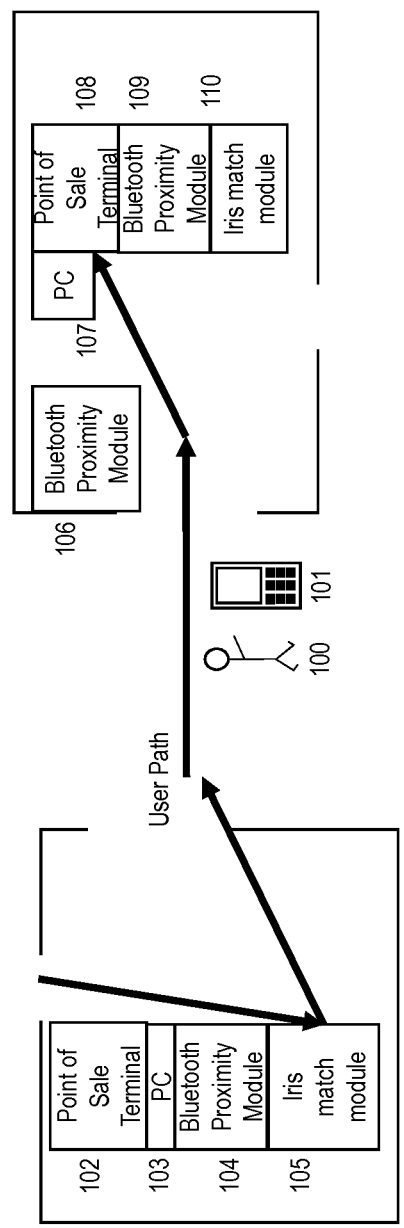
FIG. 2A is a diagram indicating different locations of sensors and spatial path of a user as he/she interacts with the sensors over time, according to some embodiments.

FIG. 2A illustrates as an example a small segment of an extended spatial path over time of a user 100 with a mobile device 101 (e.g., a mobile phone). At the beginning of this segment, the user may be at a point of sale terminal 102 where the user may perform a transaction. Next to the point of sale terminal may be a PC 103, a Bluetooth proximity module 104, and/or an iris match module 105, for instance. The user may then move to another location past a Bluetooth proximity module 106 and to another point of sale terminal 107 where the user may perform a second transaction. Next to the point of sale terminal may be a PC 108, a Bluetooth proximity module 109, and/or an iris match module 110, for example. An objective of the method is to predict a convenience metric that can be used for authorizing a given transaction, in order to optimize the experience of the user performing the transaction using one or more of the sensors.

Revenue/Expense Model

In some embodiments, an economic model of convenience is used. In the following example, the model is such that economic income J may be defined as the difference between revenue and expenses, as shown in equation (3), and an objective may be to optimize economic income with respect to a convenience metric. This model may be applicable for financial transactions performed on mobile or other devices, for example. Other economic models of convenience may be applied as described later in this specification.

In some embodiments, the revenue term of equation (3) quantifies the financial benefit to the system controlling the transaction of authorizing a particular transaction with the correct user, and the expenses term quantifies the potential financial loss of authorizing the transaction with the incorrect (e.g., fraudulent or incorrectly-identified) user.

$$J = \$Revenue - \$Expenses \tag{3}$$

In some embodiments the economic income J is optimized over a series of transactions $T_i$, performed by the user over a sequence of locations at different times. The total probable expected revenue from correct authorization may be defined as:

$$\$Revenue = \Sigma_i F(T_i, \delta_i) \Phi(T_i) P(ID) \tag{4}$$

$F(T_i, \delta_i)$ and $\Phi(T_i)$ may refer to a friction metric and a transaction benefit income, respectively. The friction metric may be the probability that the user has the skill and/or patience to tolerate completing the steps required for the transaction, given the convenience $\delta_i$ of the transaction $T_i$.

For example, it may be expected that the user should be prepared to tolerate more inconvenience in a transaction to purchase a vehicle (e.g., a relatively more expensive or important item) compared to the purchase of a coffee (a relatively less expensive or important item).

As the friction metric $F(T_i, \delta_i)$ increases (from 0 to 1 for example), the transaction steps become more convenient for the user, and the user may be more likely to perform the transaction compared to alternate transaction methods. The transaction benefit income may represent the monetary value that authorizing the transaction with the correct user brings to the system controlling the authorization. For example, in some embodiments related to credit card purchases, the transaction benefit income $\Phi(T_i)$ may be a percentage of the monetary value $V(T_i)$ of the goods involved in the transaction. In equation (4), P(ID) is a probability that a person performing a transaction is the correct user authorized to perform the requested transaction. In this example, if the system authorizes a transaction with an incorrect user, then a fraud report may be submitted at a later time (e.g., by the correct user), and any transaction benefit income may be returned to the merchant performing the transaction. The expected revenue from the transaction may therefore be a function of both the friction metric and the probability of correctly identifying the user as shown in equation (4).

On the expenses side of equation (3), in some embodiments the potential opportunity for loss to the system authorizing the transaction is defined as:

$$\$\text{Expenses} = \Sigma_i \mathcal{L}(T_i) P(\overline{ID}) \quad (5)$$

where $\mathcal{L}(T_i)$ is a loss function for a given transaction $T_i$ that may include all expenses for the transaction based on the probability $P(\overline{ID})$ that the user is classified as the incorrect user. For example, in some embodiments, the loss may be the monetary value $V(T_i)$ of the goods involved in the transaction such that $\mathcal{L}(T_i) = V(T_i)$, since the goods were incorrectly provided to the wrong person and the full cost of the goods needs to be reimbursed to the merchant. In other embodiments, the expenses may also include a term corresponding to the expected loss of future income from losing a customer due to the incorrect denial of a transaction.

In some embodiments, the probability that a user is classified as the incorrect user is $P(\overline{ID}) = 1 - P(ID)$. Also in some embodiments the monetary value to the system authorizing transactions is summed over all transactions $T_i$ ($i=1, \ldots, N(j)$) for a user j performed over time. Substituting equations (4) and (5) into equation (3) then gives a more detailed equation for the income, represented in some embodiments as:

$$\mathcal{J} = \sum_{i=1 \cdots N(j)} \Phi_j(T_i) F_j(T_i, \delta_i) P_i(ID_j) - \mathcal{L}_j(T_i)(1 - P_i(ID_j)) \quad (6)$$

Also in some embodiments, the monetary value to the system authorizing the transactions is summed over all users j (j=1, ..., N) to give, for instance:

$$\mathcal{J} = \sum_j \sum_{i=1 \cdots N(j)} \Phi_j(T_{j,i}) F_j(T_{j,i}, \delta_{j,i}) P_i(ID_j) - \mathcal{L}_j(T_{j,i})(1 - P_i(ID_j)) \quad (7)$$

In equation (7), $\delta_{j,i}$ may comprise a metric that quantifies the total convenience of the sensor combination used by the user for the transaction $T_{j,i}$ (i=1, ..., N (j)).

Cost/Assets Model

In some embodiments, other economic models of convenience can be used. For example, in the case of logical access, there may be no specific revenue associated with a transaction, and the goal may be to minimize, for example, the cost of the user's time and/or effort interacting with the sensors, as quantified previously, while still protecting the assets of the system. In certain embodiments, the expected expense from the transaction may be formulated in a similar way as to equation 3, except the monetary value of the assets being protected by the transaction may be used in the calculation. The income $\mathcal{J}$ to the system resulting from the transaction is then:

$$\mathcal{J} = -\$\text{Cost} - \$\text{Assets} \quad (8)$$

where $Cost is the expected value of the user's time spent interacting with the sensors, and $Assets is the expected value of the assets that may be lost as a result of the transaction.

This income may be negative for all positive values of expected cost and expected loss, and the goal of the system, as in the previous economic model, can be to optimize the income, which in this particular embodiment for example, corresponds to minimizing the overall loss to the system.

Example Sensor Modules used by the Economic Model

Figure 2B:
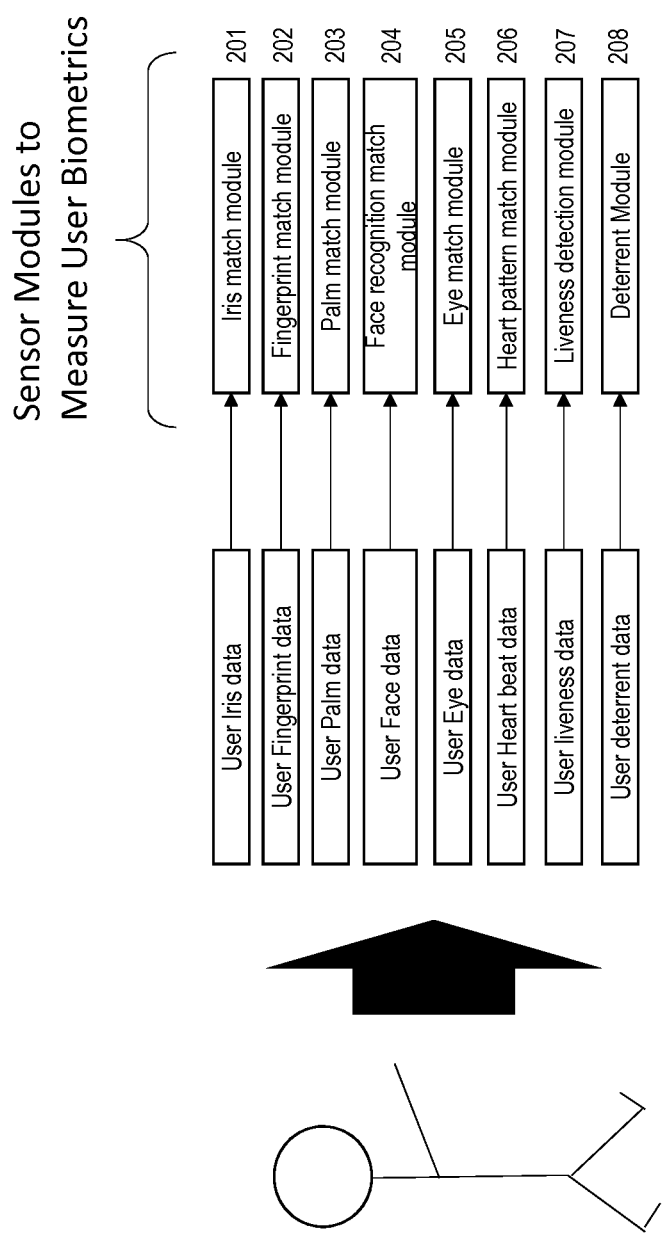
FIG. 2B is a block diagram indicating biometric sensor modules that may measure characteristics of a user, according to some embodiments.

The probability $P_i(ID_j)$ of identifying the $j^{th}$ user correctly for the $i^{th}$ transaction may be in part a function of the output of sensor modules used to measure a user's biometric data as illustrated in FIG. 2. The sensor modules may include, for example, an iris match module 201, a fingerprint match module 202, a palm match module 203, a face recognition module 204, an eye cornea match module 205, a heart pattern match module 206, a liveness detection module 207, and/or a deterrent module 208.

Figure 3:
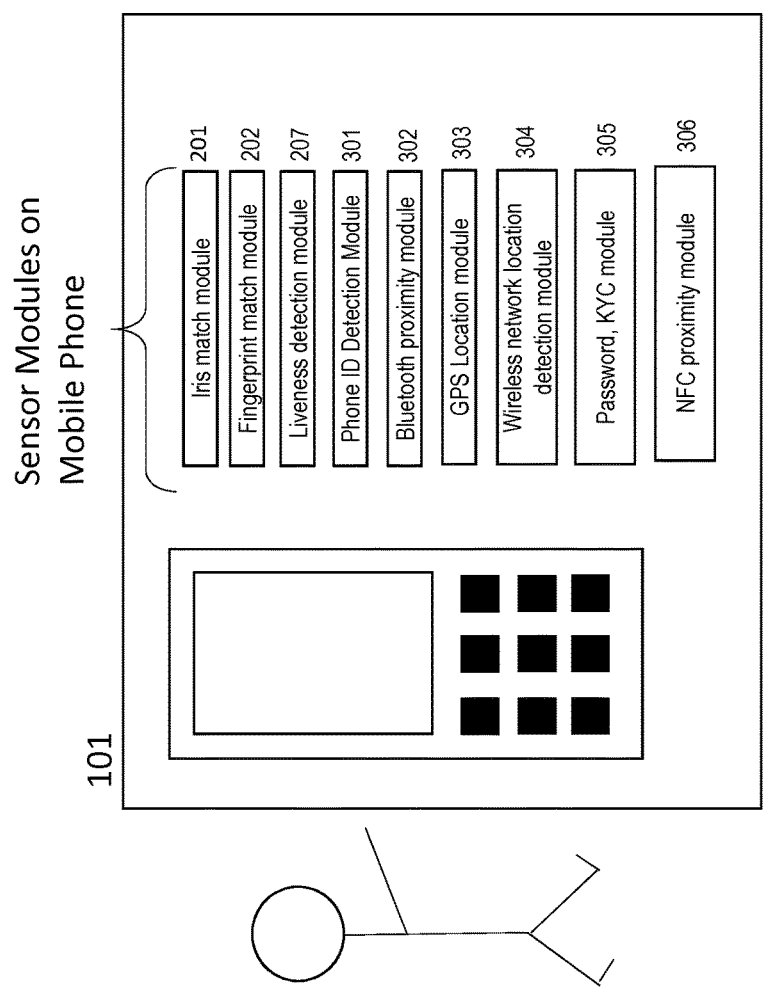
FIG. 3 is a block diagram indicating biometric and non-biometric sensor modules mounted on a mobile device, that may be held by a user, according to some embodiments.

Sensor modules may be located on a mobile device as illustrated in FIG. 3. For example, such sensor modules may include an iris match module 201, a fingerprint module 202, a liveness detection module 207, a Phone/device ID detection module 201, a Bluetooth proximity module 302, a GPS geo-location module 303, a wireless network location detection module 304, or a password or Know Your Customer (KYC) module 305.

Figure 4:
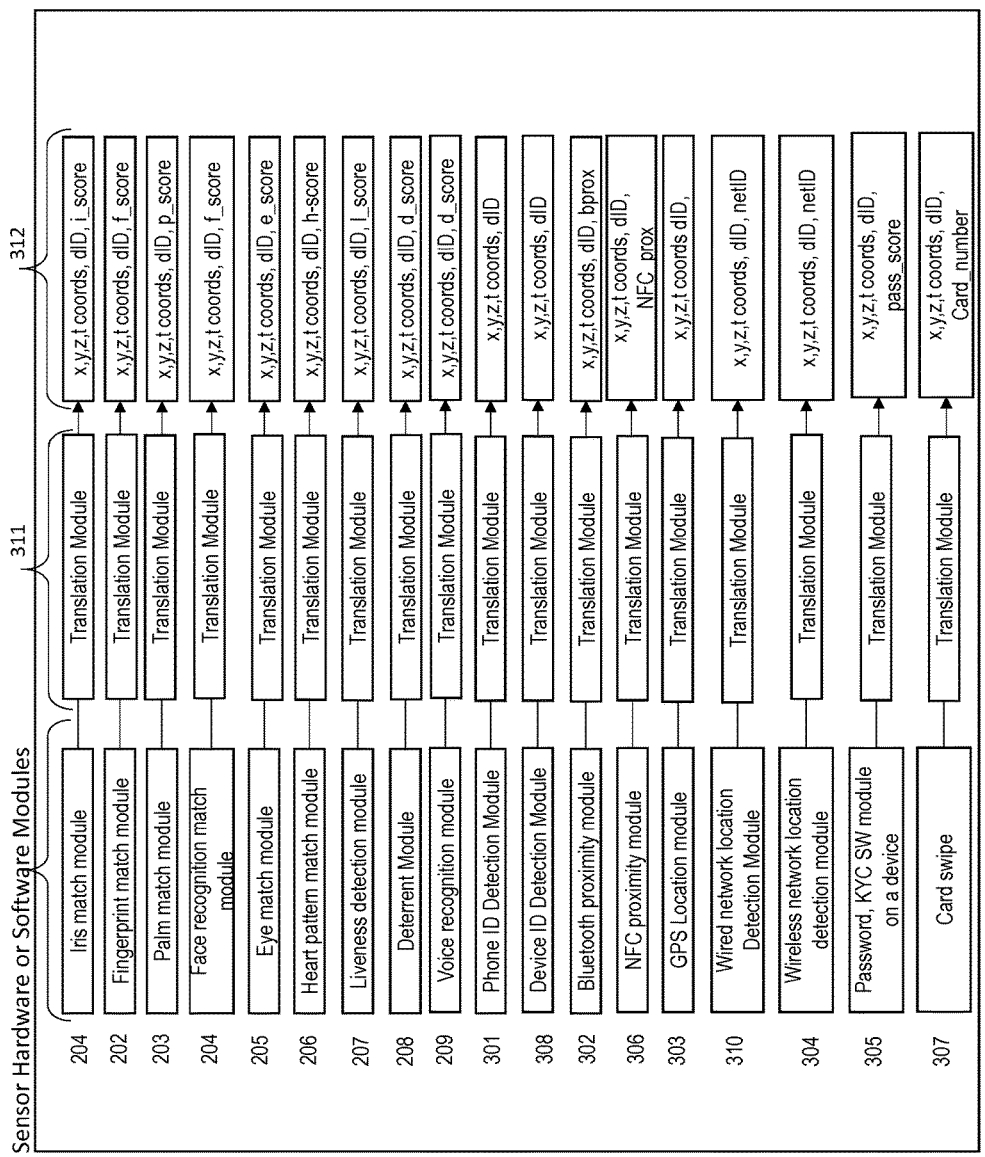
FIG. 4 is a block diagram indicating biometric and non-biometric sensor modules connected to translation modules that output sensor data, according to some embodiments.

Other sensor modules may be mounted on moving objects such as a vehicle or a mobile phone, or may be mounted at static locations as illustrated in FIG. 4 for example. The modules may comprise an iris match module 201, a fingerprint match module 202, a palm match module 203, a face recognition module 204, an eye cornea match module 205, a heart pattern match module 206, a liveness detection module 207, a deterrent module 208, a phone ID detector module 201, a device ID detector module 308, a Bluetooth proximity module 302, an NFC proximity module 306, a GPS geolocation module 303, a wired network location module 310, a wireless network location detection module 304, a password or KYC module 305, and/or a card swipe 307. An output or signal of each sensor module may pass through one or more translation modules 311 that convert the raw sensor output/signal into sensor measurements 312 or information that may include the position of the sensor (e.g., in "x, y, z" format) at time t as well as the sensor ID, dID, and/or a match score or other sensor output.

In some embodiments, the probability $P_i(ID_j)$ of identifying the $j^{th}$ user correctly for the $i^{th}$ transaction may be a function of a metric that quantifies the individual convenience to the user of using each sensor as described later in this specification.

Model Overview

The revenue/expense economic model may be used in the embodiment below, although other economic models such as a cost/assets economic model may be utilized as well, in this and/or other embodiments.

A state vector $x=[x_1, \ldots, x_M]^T$ may be introduced and may include estimates of the spatial positions of the user and the sensors at a particular time with respect to an absolute origin, with respect to a reference, or with respect to each other, parameter(s) of an activity pattern of the user, and may also include estimates of the signal outputs from the sensors. The sensors may be one or more of the sensors described earlier and in FIGS. 2, 3 and/or 4 for example. Some sensors may be fixed to a wall and therefore their geo-locations may be constant and known. The estimated value of the signal output from a sensor may be a quantized determination from that sensor whether the user's identity is verified, is not verified, or no data could be provided, or it may be a match score from a biometric output.

In some embodiments, an output (or an indication) of a sensor can be defined as a result of an authentication attempt. If the system is trying to ascertain that the user is physically in certain location then the output could be the output of the GPS sensor; or if the system is trying to determine the identity of the individual, then the output could be a result of a biometric match attempt. For a given type of biometric sensor, the output could be a number of times a user has attempted to authorize the user, and/or a record of how many times the user was successful authenticated and/or authorized. A convenience metric could be defined for a given sensor based on a generic model (e.g., fingerprint is generally less acceptable and more difficult to use than iris), and based on an individual's prior experiences of convenience or inconvenience with a certain sensor, such a generic model could be updated for them on an individual basis. Based on a user's past experience, the system can present options for authentication in the order of their convenience or usability, for instance starting with the most convenient and progressively providing more inconvenient, but potentially necessary methods. In this manner, the system can tune itself to an individual's convenience, aiming to achieve a transaction in a most convenient possible way for a given user. An optimal subset of sensors, and/or sequence of sensors (most convenient to least convenient), can hypothetically be different for different users.

For example, and in some embodiments, a sensor is not merely an image capture device and/or a matcher, but has intelligence attached to it which can inform the system if the biometric match attempt was successful or not, and/or other information about the attempt. For instance, a sensor may maintain or provide a record of how many tries a user made (e.g., incorrect or unsuccessful tries)" which may be indicative of the user's inexperience, incompatibilities, or past interactions with the device (e.g., smudges on sensor causing difficulty, incorrect placement of iris/fingerprint). The sensor can register information related to a difficulty or ease of use of the sensor, e.g., for a particular user, such as a number of unsuccessful attempts, that later, can help to determine a convenience metric for a specific biometric device to a particular user habits. In some embodiments, the sensor can register information related to particular habits of a user and/or mode/characteristic of use of the sensor by the user, such as detecting that the user often provides a partial fingerprint (e.g., left portion) due to placement or position relative to the sensor, or provide a partially suboptimal fingerprint due to sweat smudges (e.g., after going for a jog), or usually provides a left iris rather than a right iris for biometric matching. The system and/or sensor activity model can incorporate such information to determine which sensors to use and/or whether such expected behavior/characteristic can be used to lower or meet a threshold for matching or authentication.

In some embodiments, the probability $P_i(ID_j)$ that transaction $T_i$ is performed by the correct user j can be defined as a function G of the user's vector $x_{j,i}$ at the time $t_i$ of the transaction and the convenience parameter $\delta_{j,i}$ as the following:

$$P_i(ID_j) = B(x_{j,i}, \delta_{j,i}) \tag{9}$$

where $x_{j,i} = x_j(t_i)$.

Substituting equation (9) into equation (7), yields the following, for instance:

$$\mathcal{J} = \sum_j \sum_{i=1\cdots N(j)} \Phi_j(T_{j,i}) F_j(T_{j,i}, \delta_{j,i}) G(x_{j,i}, \delta_{j,i}) - \tag{10}$$

$$\mathcal{L}_j(T_{j,i})(1 - G(x_{j,i}, \delta_{j,i}))$$

In equation (10), the total convenience metric $\delta_{j,i}$ for a transaction $T_i$ can appears on the revenue and/or the expense sides (see equation (3)). As the transaction can be more convenient conducted or concluded, the user may be more likely to perform the transaction and the term $F_j(T_{j,i}, \delta_{j,i})$ may tend towards a value indicating higher convenience (e.g., 1). On the other hand, the user's identity may be less likely to be correctly identified since typically, more convenience for a user may correspond to the acquisition of less sensor data from that time instant that may be used in part for verifying the identity of the user, and in this case the probability of the correct identity of the user $G(x_{j,i}, \delta_{j,i})$ may tend towards 0 for example.

In some embodiments, an objective is to predict the total optimal convenience metric that optimizes expected income, and in some embodiments the optimal expected income corresponds to the maximum expected income for the system authorizing transactions, such that:

$$\mathcal{J}_{max} \mathcal{J}(\delta^*) \tag{11}$$

where $\delta^*$ is the optimal total convenience metric for the $j^{th}$ user for the $i^{th}$ transaction corresponding to $\mathcal{J}_{max}$.

In some embodiments, if the optimal predicted income $\mathcal{J}_{max} \geq 0$ then the expected economic revenue from the transaction can outweigh the expected economic expense from the transaction, and the system may authorize the transaction. Conversely, if the optimal predicted income $\mathcal{J}_{max} < 0$ then the expected economic expenses from the transaction can outweigh the expected economic revenue from the transaction, and the system may deny authorization of the transaction.

In some embodiments where compliance requirements are imposed on top of convenience and income considerations, an additional constraint that may be imposed on the transaction before authorization is to determine $\mathcal{J}_{max}$ subject to the constraint that the probability of the identity of the user $G(x_{j,i}, \delta_{j,i})$ is greater than the specified compliant value. In cases of more complex compliance constraints, equation (10) can be modified using an approach based on LaGrange multipliers where $\mathcal{J}_{max}$ can be determined subject to equality constraints that correspond to the compliance requirements.

As can be noted from equation (10), the income J is not just a function of the state vectors and sensor outputs at the time and location of the current transaction; it can also be a function of the state vectors and sensor outputs corresponding to transactions performed at previous times and potentially at other locations. The activity pattern models of the user and the sensors can describe the relationship between these state vectors and sensor outputs over time. The models can allow predictions of state vector elements to be performed for a user at a point of transaction even before the user performs any (inconvenient) steps in a transaction. For example, if the probability of correct identification of the user based on the predicted values of the state vector elements is consistent with other measurements acquired without any inconvenience to the user (such as using the Bluetooth Low Energy module 302 or phone ID detection module 301), then the system may determine that the user is only required to perform a small number of convenient steps in order to authorize the transaction with a likelihood of positive income. However, if the probability of correct identification of the user based on the predicted values is inconsistent with the measurements, then the system may determine that a large number of more inconvenient steps are required in order to authorize the transaction with a likelihood of positive income.

In some embodiments of determining the prediction of the total convenience metric, a component of the activity pattern models for the sensors may be sensor performance models. The sensor performance models may comprise device-specific metrics such as false accept and false reject rates for any user, as well as specific performance metrics corresponding to each individual user. The sensor performance models may be based on sensor indications, outputs or signals, for example as discussed earlier. For example, performance metrics may include the quality of an acquired biometric image quantified by an image focus measure, the match score of the user's biometric image when compared to their reference biometric image, or may be the time that the user takes to use the sensor. The sensor performance models may impact the prediction of the total convenience metric in several ways. For example, if the user habitually takes a long time to use a particular sensor due to lack of familiarity or poor enrollment imagery for example, then the convenience metric corresponding to the sensor for that particular user may be updated to reflect the increased inconvenience, so that the system automatically selects alternate sensors for use in the transaction for that particular user. To the extent that the models of the activity patterns of the user, the activity patterns of the sensors and the performance of the sensors are accurate, the convenience for the user for a given transaction as quantified by the total convenience metric may be greater compared to the convenience of a transaction performed without using the system, for a given likelihood of positive income resulting from the transaction. Similarly, for a given level of convenience, the likelihood of positive income resulting from the transaction may be greater using the system compared to the likelihood of positive income without using the system.

In some embodiments, $\mathcal{I}_{max}$ is also not just a function of user j; it is also a function of other users such as j−1, j−2, ..., etc. An intra-user model may describe the relationship between vectors $x_j$, $x_{j-1}$ and $x_{j-1}$ for different users j, j−1, j−2 over time. For example, in a security application, it may be required that user j and user (j−1) are present together in the same place at the same time in order to access a critical database or to reverse a sales charge at a checkout counter.

Model Solution

For simplicity of notation, the illustrative, non-limiting embodiment below is computed for a single independent user, which corresponds to the assumption that a user's transactions are independent of other users. The same method however can be extended to incorporate dependence of a user's transactions on other users, as shown in equation (10) for example.

Total Convenience Metric and Friction Metric

Table 1 shows that the model for each data sensor $f$ includes an individual convenience metric, a signal vector, and a probability of correct identification attached to it.

TABLE 1

| Sensor table | | | |
|---|---|---|---|
| Sensor | Individual convenience | Signal vector | Probability of Correct |
| $f_1$ | $a_1$ | $x_1(t)$ | $P_1$ |
| ... | ... | ... | ... |
| $f_M$ | $a_M$ | $x_M(t)$ | $P_M$ |

In some embodiments, a method for determining the total convenience metric $\delta_i$ comprises determining a monetary value of the time a user invests in performing a transaction. If S is the salary of the user in monetary units per second, and $T\ f$ is the time taken to perform the transaction on sensor $f$, then the value of the time invested by the user in using multiple sensors is $S(T_1+T_2+\ldots)$. It may also be expected that a user is prepared to spend more time on a high value transaction compared to a low value transaction. The individual convenience metric $\alpha\ f$ for each sensor $f$ may be normalized by the monetary value $V(T_i)$ of the transaction such that:

$$\alpha_f = \frac{ST_f}{V(T_i)} \quad (12)$$

More than one sensor may be used in a transaction and in some embodiments the total convenience metric for the transaction is the sum of the individual convenience metrics for the X sensors used such that:

$$\delta_i = \sum_{k=1}^{K} \frac{ST_f}{V(T_i)} \quad (13)$$

This output of the sensor model 807 may be fed into a convenience prediction engine 805. In some embodiments, the total convenience metric can be converted into the probabilistic friction metric $F(T_i, \delta_i)$ for a transaction, so that as the time to perform the transaction decreases then the probability of the user completing the transaction may increase.

Figure 10:
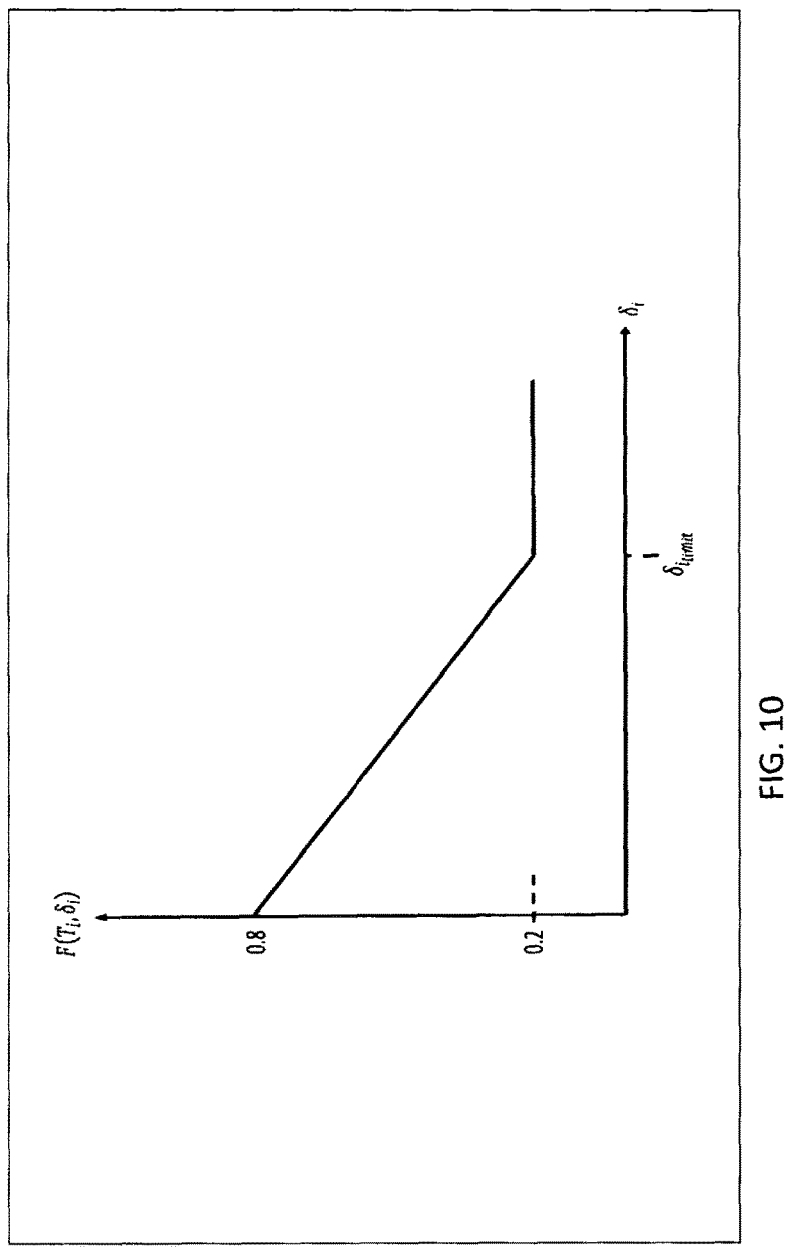

The relationship between the total convenience metric $\delta_i$ and the friction metric $F(T_i, \delta_i)$ can be determined from empirical studies of the behavioral analysis of users performing transactions. FIG. 10 depicts one embodiment of such a relationship. For instance, the probability of performing the transaction may be 0.8 if the total convenience metric $\delta_i$ is zero, and decreases to a lower probability of 0.2 as $\delta_i$ increases.

FIG. 10 can also show that each sensor has a calibrated probability of correct identification assigned to it. This probability may be pre-determined based on the results of reported empirical studies on sensor performance. For example, an iris match sensor module $f$ may have a probability of incorrect identity of a user of 1 in 1.3 million, and P$f$ may then be (1-1/1.3 million).

Activity Pattern Model

Figure 5:
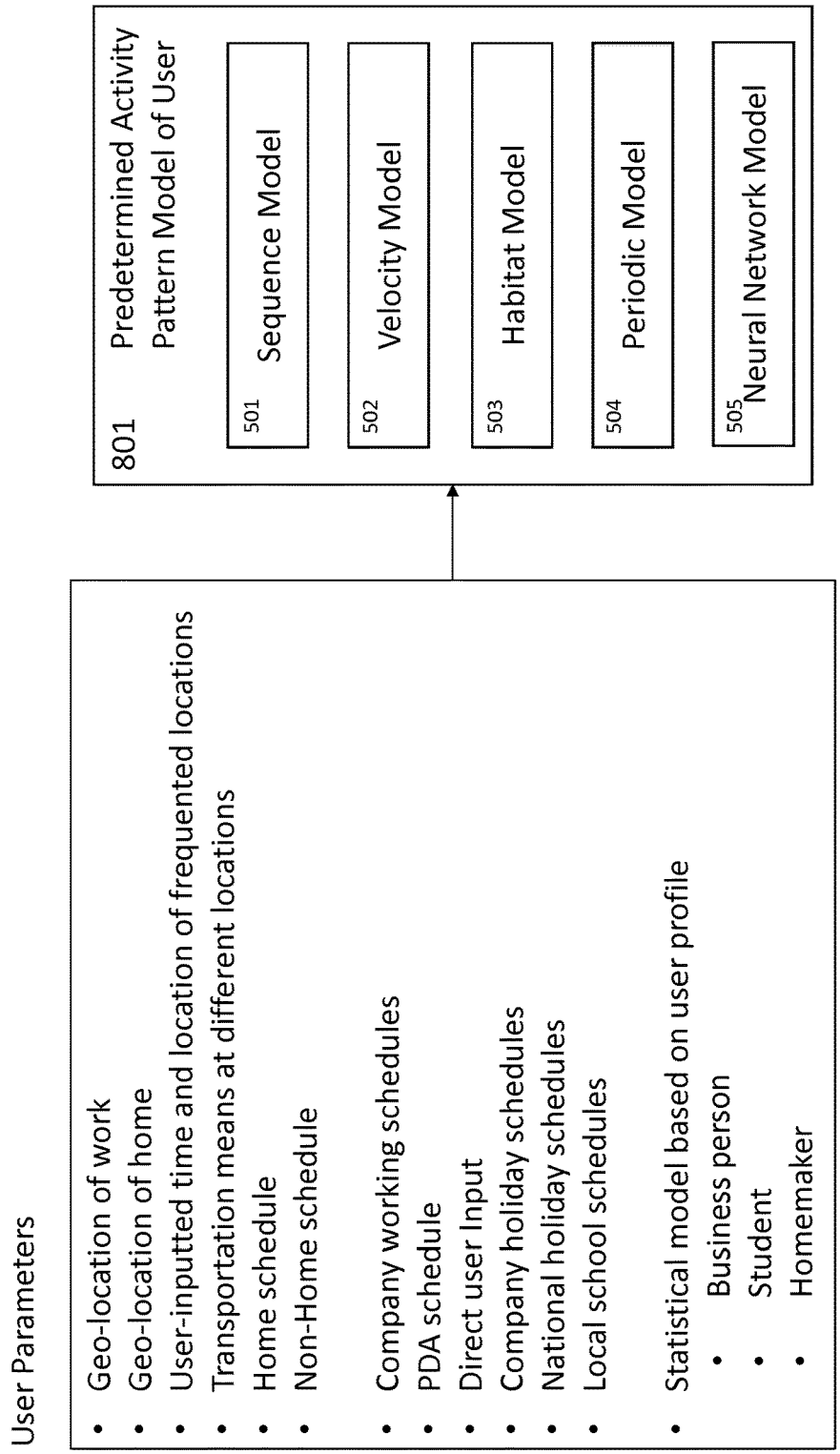
FIG. 5 is a block diagram indicating user parameters and a pre-determined activity pattern model for a user, according to some embodiments.

Activity pattern models that characterize the spatial pattern of the user and the sensors over time may be used. FIG. 5 depicts examples of activity pattern models of a user. FIG. 5 depicts examples of activity pattern models of one or more sensors. In some embodiments, the activity pattern models have a pre-determined component 801, 802 that embodies a pre-determined spatial-temporal pattern of the user and sensors respectively, and an updated component that incorporates updates of one or more parameters of the activity pattern models performed by model update engines 803, 804.

In some embodiments, an example of an activity pattern model is a spatiotemporal sequence model for the user 501 and for the sensors 601. For example, in an Enterprise Resource Planning (ERP) process, a pre-determined component of a sequence model may include a sequence of steps comprising: the user logging into a personal work PC having a first ID number, and then subsequently logging into a database administration PC having a second ID number within a time period. The sequence model parameters corresponding to the actual times that the user logs into the database administration PC are updated using the user model update engine 803, on some embodiments. The pre-determined component of the sequence model can be based on pre-determined domain knowledge of the specific tasks and can be stored in a lookup table. The result may be a set of parameters 701 that encode the sequences. For example, a data sequence may include information about a sensor with identification label s1, the time t1 that a user is expected to take to move between sensor s1 and a second sensor with identification label s2, and the variance var_t1 of the expected time t1.

Figure 7:
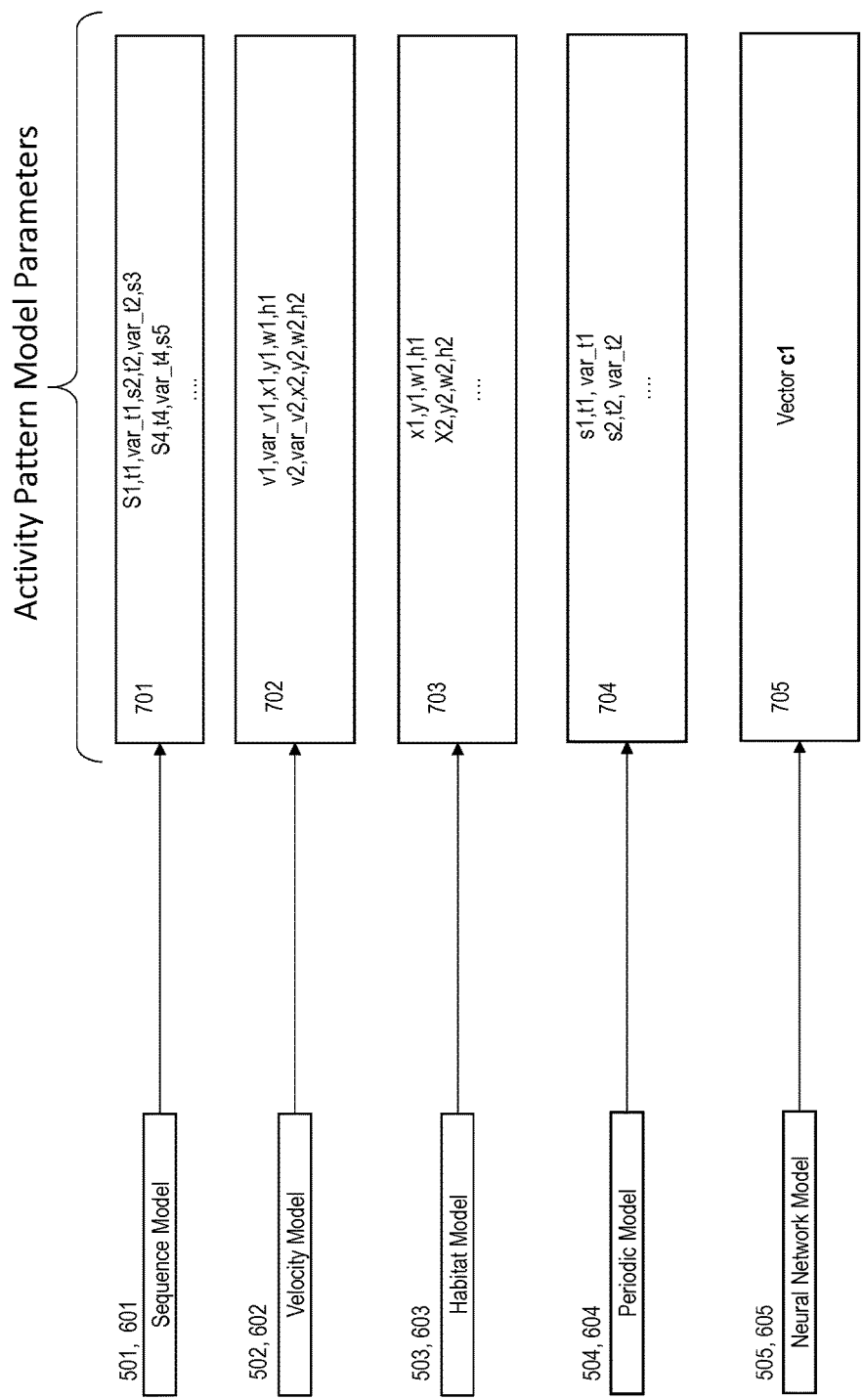
FIG. 7 is a block diagram indicating types of activity pattern models represented by sets of parameters, according to some embodiments.

In some embodiments, a further example of an activity pattern model is a probability density model of user velocity 502 and sensor velocity 602. For example, the pre-determined component of the probability density model of user velocity may vary depending on the state estimate of the current location of the user. For example, at work and at home the user's velocity may be limited to walking speed, whereas in any other location the velocity may correspond to the speed of a vehicle. The velocity model may be zero for sensors mounted to static devices or structures, such as a wall. The coordinate system of the velocity model may be with respect to either the user or other sensors. For example, the pre-determined velocity model for a sensor embedded in a phone may be that its relative velocity with respect to the user is zero, even though the user's velocity changes over time. The result may be a set of parameters 702 that store the probability density model of the velocity. For example, a parameter set: $v_1$,var($v_1$), ($x_1$, $y_1$),$w_1$, and $h_1$ may indicate that the velocity of the user is expected to be $v_1$ with a variance of var($v_1$) within a spatial region defined by a rectangular region centered on geo-coordinates ($x_1$, $y_1$) with width $w_1$ and height $h_1$. FIG. 7 depicts illustrative embodiments of parameters associated with or based on corresponding activity pattern models.

A further example of an activity pattern model is a habitat model for the user 503 and for the sensors 603. The habitat model may capture or indicate the probability that a user is at a specific location at a specific time. The result may be a set of parameters 608 that may indicate a habitat defined by a spatial region defined by a rectangular region centered on geo-coordinates x1,y1 with width w1 and height h1. A related model is a periodic model for the user 504 and for the sensors 604. The periodic model may capture or indicate the probability that a user is at a specific location at a specific time in a pattern that is expected to repeat over time. The periodic model can be used to characterize repeated activities of an individual over a period of hours and days. The result may be a set of parameters 704 that may indicate a periodic model for the user's position defined by a set of parameters s1, t1, var_t1 where s1 is a geolocation of the user, t1 is the periodic time (for example in seconds) of the periodic pattern, and var_t1 is the variance of the periodic time. The pre-determined component of the habitat and periodic models may be based on a user's Personal Digital Assistant (PDA) schedule, a company working and holiday schedule, a national holiday schedule, local school schedules, or direct input from the user for example.

Other activity pattern models may comprise a neural network based learning model for the user 604 and/or for the sensors 605. In this case, the activity pattern modeling process may be treated as a learning process of estimating the probable location of the user and/or sensors given their previous probable locations. Neural networks may be trained on prior training data and then used to provide a probable estimate of the user and/or sensor positions. The result may be a classifier vector c1, 705.

According to some embodiments, the activity pattern models may be constructed as a Bayesian Network, Hidden Markov Model, or other variant of the Markov model.

The parameters of the pre-determined and updated activity pattern models can be determined using several estimation and updating techniques based on the pre-determined data or the actual observations. According to some embodiments, the parameters may be modeled as a probabilistic distribution, such as a normal, gamma, Poisson, beta, or other distribution estimated from the data. According to some embodiments, one or more of the following could be used alone or in combination to estimate the pre-determined and updated parameters of the activity pattern models: Kalman filter, Wiener filter, Neural Network, Deep Learning, Latent Variable Model, Bayesian Network, Graphical Model, Tree-based models, Discriminant Analysis, Support Vector Machines, another classification technique, Principle Component Analysis, Regression analysis, Splines, Wavelets, Least-squares function fitting, another type of function estimation, Expectation-Maximization Algorithm, Belief Propagation Algorithm, Nearest Neighbor Algorithms, Clustering Algorithms, another learning technique, another data series forecasting technique.

For example, the parameters of the pre-determined or updated activity pattern models in one embodiment may be determined using a Kalman estimation process. In the Kalman estimation process, the series of measurements observed over time, and associated inaccuracies including noise, are filtered to produce a statistical optimal estimate of the underlying parameters of the activity pattern models. In another embodiment, a least squares estimation process may be performed. In the least squares estimation process, the sum of the squared differences between the measurements and the values estimated by the model may be computed. The squared difference error may then be minimized with respect to the parameters of the activity pattern models to determine the pre-determined or updated set of parameters. The minimization may be performed using a closed-form least-squares minimization method, or using an exhaustive search method wherein a range of parameters for the activity pattern models are used to compute the squared difference error, and the parameters corresponding to the minimum squared difference error are used as the determination of the pre-determined or the updated activity pattern models. In some embodiments, the update process of the activity pattern models can be performed as part of the convenience metric prediction engine such that update engine modules 803,804 are embodied in module 805.

As an example of the utility of the prediction of the total convenient metric, if an employee habitually logs into their personal work computer at the beginning of each day and consistently logs into a critical database 8 hours later, then the combined activity pattern model can predict a high probability of the user's login to the critical database 8 hours after login to their personal computer, and a lower probability at times before or after. If the user tries to login to the critical database 8 hours after initial login to their personal computer then the time and position of the user's login attempt is consistent with the prediction of the total convenience metric, and the system determines a convenient login process for the user. If the user unexpectedly tries to login just 4 hours after login to their personal work computer then the time of the user's login is inconsistent with the prediction of the convenience metric, and the system can compensate by determining a less convenient (e.g., more stringent) set of steps (or sensors) to login.

The prediction approach can be contrasted to weighting formulae that perform weighted averages of prior probabilities of a user or sensor locations at previous times based on proximity in time. The weighting formula can incorrectly determine that the probability of the user's login to the critical database 4 hours after login to their personal computer is in fact more likely than login at 8 hours since 4 hours between the two logins is a smaller time difference than 8 hours.

In certain embodiments, a sensor output model may be used. The sensor output model can model the specific output of sensors with respect to a particular user. For example, Bluetooth Low Energy devices have "near", "far" and "immediate" range detection settings from one device to another in accordance with the Bluetooth protocol. For example, one user 100 with a mobile phone 101 with a Bluetooth Low Energy sensor 302 may habitually choose a particular physical walking path in a retail store or in the workplace that result in their detection at a "far" distance on one Bluetooth sensor 109, and a "near" distance on a second Bluetooth sensor 106. Another user on the other hand may choose a different physical walking path resulting in different values of the sensor outputs. A pre-determined model of the sensor output can be based on the path the user is expected to take.

The sensor output model can be updated in the update engines 803,804 using several estimation and updating techniques, and in one embodiment the Kalman estimation process described below can be used, or in another embodiment minimization, with respect to the model parameters, of the least-squared-error between the output provided by the model and the observations made.

Convenience Prediction Engine

Figure 8:
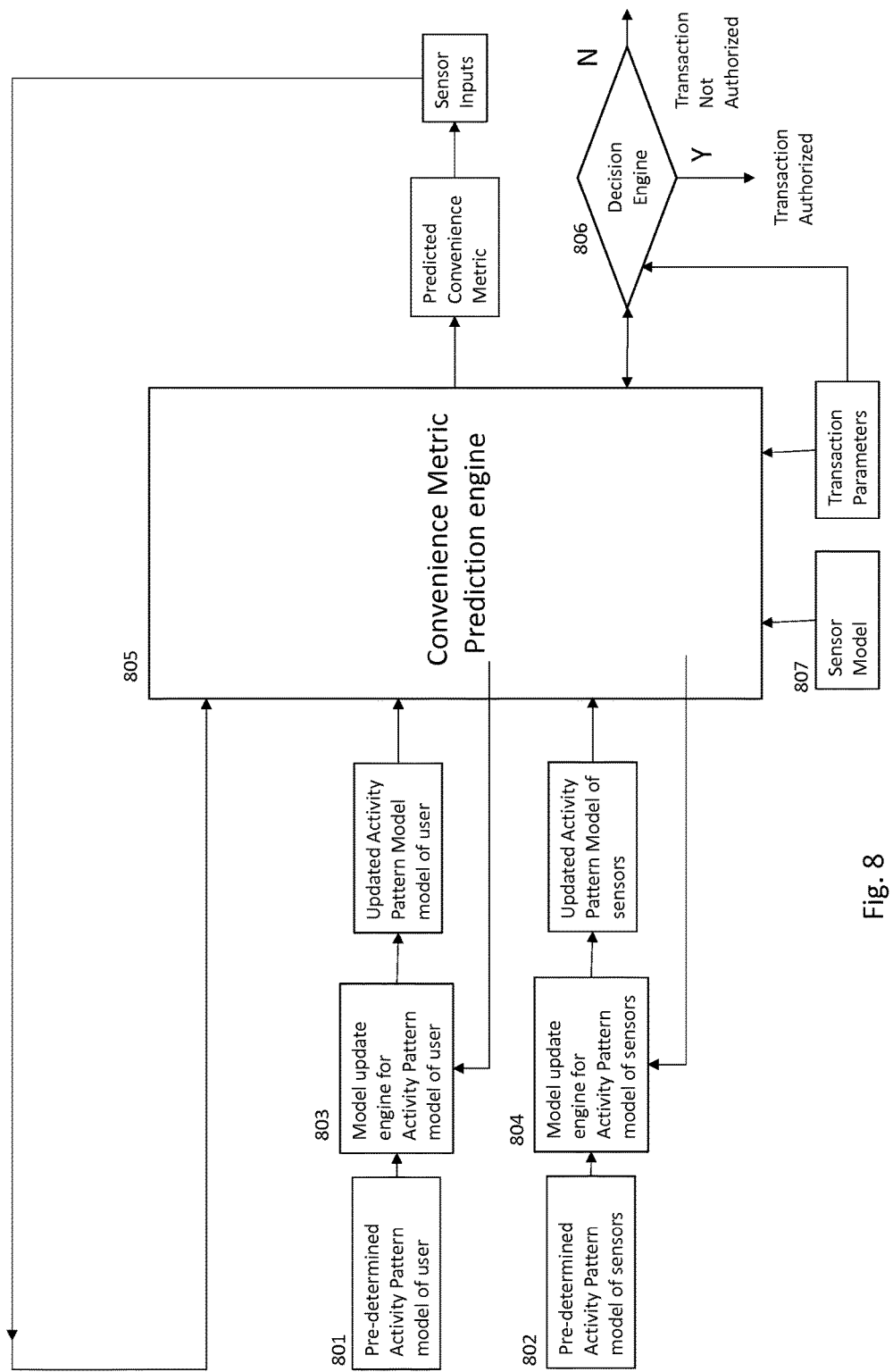
FIG. 8 is a block diagram illustrating model-based prediction of an optimal convenience metric, according to some embodiments.

Returning to equation (10), an objective may be to determine a prediction of an optimal total convenience metric $\delta_i$. One embodiment of a convenience prediction engine 805 that may perform this prediction is illustrated in FIG. 8. According to some embodiments, the convenience metric prediction engine may be constructed as a Bayesian Network, a Hidden Markov Model, or other variant of a Markov model.

The parameters of the convenience metric prediction engine can be determined using several estimations and updating techniques based on the pre-determined data or the actual observations. According to some embodiments, the parameters may be modeled as a probabilistic distribution, such as a normal, gamma, Poisson, beta, or other distribution estimated from the data. According to some embodiments, one or more of the following could be used alone or in combination to estimate the parameters of the predicted convenience metric: Kalman filter, Wiener filter, Neural Network, Deep Learning, Latent Variable Model, Bayesian Network, Graphical Model, Tree-based models, Discriminant Analysis, Support Vector Machines, another classification technique, Principle Component Analysis, Regression analysis, Splines, Wavelets, Least-squares function fitting, another type of function estimation, Expectation-Maximization Algorithm, Belief Propagation Algorithm, Nearest Neighbor Algorithms, Clustering Algorithms, another learning technique, another data series forecasting technique.

In some embodiments of the convenience metric prediction engine 805, a Kalman filtering estimation process considers the sensor measurements, parameters of the sensors and the user, and the parameters of the activity model as a series of measurements over time, containing inaccuracies and partial data, and produces a statistically optimal estimate of the underlying system state x(t) that may include for example the spatial position of the user and each sensor, and sensor outputs, over time.

In the Kalman filter, the system's state $x_i$ at the time of a transaction may depend recursively on the output of the system at the time of the previous transaction, $x_{i-1}$ such that:

$$x_i = Ax_{i-1} + Bu_{i-1} + w_{i-1} \tag{14}$$

The observation vector $z_i$ may include or represent actual sensor measurements at the time of one transaction and may be defined as:

$$z_i = Hx_i + v_i \tag{15}$$

The random variables $w_i$ and $v_i$ may represent the process and measurement noise respectively. They may be assumed to be independent of each other, and with normal probability distributions such that $$p(w) \sim N(0, Q), \tag{16}$$

$$p(v) \sim N(0, R), \tag{17}$$

where Q and R are the process noise covariance matrix and measurement noise covariance matrix respectively.

Matrix A can relate the state at the previous time step i−1 to the state at the current step i, given the models in the absence of either a driving function or process noise. Matrix A may be estimated using a separate Kalman or least squares estimation process performed infrequently on prior sensor data and models of the user and sensors. Matrix B can relate any optional external control signal $u_i$ that may influence the state $x_i$. In some embodiments, there may be no external influences on the system such that $u_i=0$. Matrix H can relate the units of measure of the outputs of the sensors to the units used in the state $x_i$.

In some embodiments, the Kalman filter can relate an a posteriori state estimate $\hat{x}_i$ and an a priori state estimate $\hat{x}_i^-$ such that:

$$\hat{x}_i = \hat{x}_i^- + K_i(z_i - H\hat{x}_i^-) \tag{18}$$

In some embodiments of the Kalman filter, the Kalman Gain is defined as:

$$K_i = P_i^- H^T (H P_i^- H^T + R)^{-1} \tag{19}$$

where $P_i^-$ is the a posteriori estimate of the error covariance such that $P_i^- = E[e_i^- e_i^{-T}]$ and where $e_i^- = x_i - \hat{x}_i$.

In some embodiments of the Kalman filter, the a posteriori updated estimate of the error covariance $P_i$ may be defined as:

$$P_i = (I - K_i H) P_i^- \qquad (20)$$

where I is the identity matrix. To perform an update of the state vector, the Kalman Gain as defined in equation (19) may be computed, and any available sensor output measurements $z_i$ may be used in equation (18) to provide an a posteriori state estimate. An updated a posteriori error covariance estimate may then be computed as in equation (20) for use in the next update of the state.

One advantage of a Kalman filter based approach is that the sensor data from prior transactions performed hours or days earlier can still influence the prediction of the total convenience metric without the system having to access the raw sensor data from the prior transactions, since the influence from the prior transactions is embodied in the state vector.

In some embodiments where it is feasible to access some or all of the prior sensor data at the time of a transaction, a Wiener filter based approach can be used instead, which may result in a further optimized estimate of the total convenience metric.

Returning to equation (10), in order to predict the optimal convenience metric to maximize the expected economic income J from a transaction, the probability of the identity of the user $G(x_i, \delta_i)$, may be determined. In this embodiment $G(x_i, \delta_i)$ may be a function of the state vector and the total convenience metric $\delta_i$.

In some embodiments, the estimates of the state vector elements corresponding to the output of a given sensor $f_k$ may provide a probability of correct identification of the user from the sensor $I(x_{i,k}, \delta_i)$. The estimates of the state vector elements $x_{i,\alpha}$ that correspond to parameters of the activity pattern models of the user and sensor may also provide an individual probability $p(x_{i,\alpha})$ of the user being at the sensor.

In some embodiments these probabilities may be combined using a Naïve Bayesian method that results in a simple probabilistic formulation based on applying Bayes theorem (e.g., with strong independence assumptions) such that:

$$G(x_{i,k}, \delta_i) = \frac{p(x_{i,a}) I(x_{i,k}, \delta_i)}{p(x_{i,a}) I(x_{i,k}, \delta_i) + (1 - p(x_{i,a}))(1 - I(x_{i,k}, \delta_i))} \qquad (21)$$

In some embodiments the total probability of correct identification of the user for a combination of M sensors can be computed using the same Naïve Bayesian method such that:

$$G(x_i, \delta_i) = \frac{\prod_{k=1}^{k=M} G(x_{i,k}, \delta_i)}{\prod_{k=1}^{k=M} G(x_{i,k}, \delta_i) + \prod_{k=1}^{k=M} (1 - G(x_{i,k}, \delta_i))} \qquad (22)$$

The probability of correct identification of the user (equation 22) can be inserted into equation 10 to give an expression for expected income J from a transaction as a function of the total convenience metric $\delta_i$.

Optimal Total Convenience Metric

The optimal predicted income can be optimized as a function of the predicted total convenience metric. In some embodiments, this is performed by identifying each combination of sensors that is available at a time of transaction, computing the predicted total convenience metric for each combination, computing the expected income $J$ from equation 10 for each predicted total convenience metric, and by identifying an optimal predicted total convenience metric $\delta^*$. In some embodiments, this optimal predicted total convenience metric is the predicted total convenience metric that corresponds to the maximum value of the expected income $J_{max}$.

In some embodiments, if the optimal predicted income $J_{max} \leq 0$ then the expected economic expense from the transaction outweighs the expected economic revenue from the transaction, and therefore the system may not authorize the transaction.

In some embodiments, if the optimal predicted income $J_{max} \geq 0$ then the expected economic revenue from the transaction outweighs the expected economic expense from the transaction. The system may then request that the user interacts with the combination of sensors corresponding to the optimal total convenience metric $\delta^*$. The state vector may then be updated using the additional sensor data, and the expected income $J$ may then be recomputed. If the recomputed expected income remains such that $J_{max} \geq 0$, then the system may authorize the transaction.

In some embodiments where compliance requirements are imposed on top of convenience and income considerations, then an additional constraint imposed on the transaction before authorization is to determine $J_{max}$ subject to the constraint that the probability of the identity of the user $G(x_{j,i}, \delta_{j,i})$ is greater than the specified compliant value. In other embodiments, equation (10) can be modified using an approach based on Lagrange multipliers where $J_{max}$ can be determined subject to equality constraints, in order to impose compliance or other constraints.

Performance of the Predicted Optimal Total Convenience Metric

The performance of the process for predicting the optimal total convenience metric convenience for a transaction can be quantified by computing the ratio of the total convenience metric estimated without model prediction to the total convenience metric estimated with model prediction.

In some embodiments and in the case of the Kalman filter model prediction method, setting the Kalman Gain Matrix to the identity matrix I is equivalent to ignoring the predicted state and only using the measured signals. The state vector estimates in equation (18) and the a posteriori updated estimate of the error covariance in equation (20) can then be computed with K=I to determine the expected income computed without prediction, $J_{max}(I)$, and the corresponding total convenience metric, $\delta^*(I)$.

In the example where convenience is quantified by the time invested by the user as shown by equation (12)

$$\delta_f = \frac{ST_f}{V(T_i)},$$

then increasing values of the total convenience metric corresponds to increasing inconvenience to the user and increased time invested by the user. The performance ratio Pc with respect to the convenience of the transaction performed using the predicted optimal total convenience metric can then be computed as:

$$Pc = \frac{\delta_*(I)}{\delta_*} \quad (23)$$

When Pc>1 then the system using the prediction of the total convenience metric increases convenience for the user compared to the system without prediction, in some embodiments.

Similarly, the performance with respect to the expected income of the transaction Pi performed using the predicted optimal total convenience metric can be computed as:

$$\mathcal{I}_{diff} = \mathcal{I}_{max} - \mathcal{I}(I)_{max} \quad (24)$$

where $\mathcal{I}_{diff}$ is the difference between: (i) the expected income resulting from the system using the prediction of the total convenience metric and (ii) the expected income $\mathcal{I}(I)_{max}$ resulting from the system without using the prediction.

In some embodiments, statistics such as the median and average of the metrics Pc and $\mathcal{I}_{diff}$ can be computed over multiple transactions for a user in order to quantify the efficacy of the system, and may be used as an input for the updating of the activity parameter models.

Example Processing System

Figure 9:
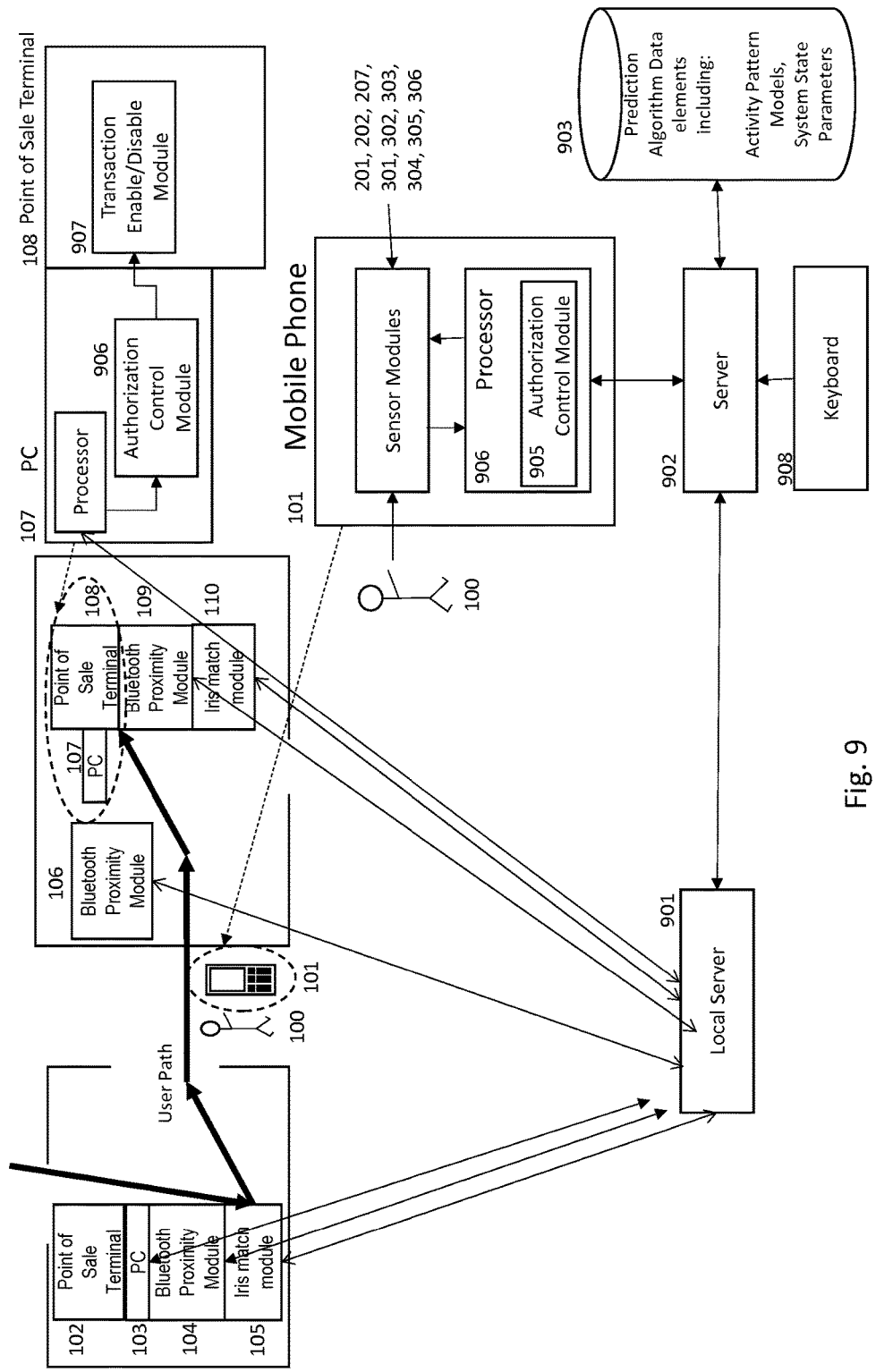
FIG. 9 is a schematic of a processing system for predicting an optimal convenience metric, according to some embodiments.

The system and method can be implemented using many physical embodiments. FIG. 9 shows one illustrative embodiment of a processing system that predicts an optimal convenience metric for authorizing transactions. The processing system may include a plurality of modules, elements or components, such as authorization control module 905 and iris match module 104, which may be located in one or more devices. Each of these modules, elements or components is implemented in hardware, or a combination of hardware and software, in one or more embodiments. For instance, each of these elements or components can include any application, program, library, script, task, service, process or any type and form of executable instructions executing on hardware of the system, in one or more embodiments. The hardware includes one or more of circuitry or a processor, for example, as described above in connection with at least 1B and 1C, in one or more embodiments.

By way of illustration, a user may have moved from a first point of transaction at point of sale terminal 102 to a second point of transaction at point of sale terminal 108, for example. The user may now wish to perform a transaction at the second point of transaction.

A local server 901 may be connected by network connection to a first point of transaction where there is a PC 103, a point of sale terminal 102, and sensors that include a Bluetooth proximity module 104 and/or an iris match module 105. The server 901 may also be connected by network connection to a Bluetooth Proximity module 106 that may be located near a doorway, and may also connected to a second point of transaction where there is a PC 107, a point of sale terminal 108, a Bluetooth proximity module 109 and/or an iris match module 110. The convenience prediction engine 805 may be implemented in part based on elements of server 902 and in part based on elements of mobile phone processor 906 and/or PC 107.

Data required for the activity pattern models may be entered at least in part by the user or an operator using a keyboard 908 connected to the server, or may be transferred, e.g., from Microsoft's Outlook Calendar located on database 903. The database 903 may comprise any embodiment of a storage device 122, 128,140, such as those described above in connection with at least FIGS. 1B and 1C. The mobile phone 101 of the user 100 may contain sensors such as an iris match module 201, a fingerprint match module 202, a liveness detection module 207, a phone ID detection module 301, a Bluetooth proximity module 302, a GPS geolocation module 303, a wireless network location detection module 304, a password or KYC module 305, and/or an NFC proximity module 306. The sensors on the phone are connected to a processor 906 that is connected by wireless network connection to the server 902 in some embodiments. Pre-determined activity pattern models are stored in a database 903 and are fed into the convenience metric prediction engine 805 that is implemented on server 902 for example. A first component or operation of the convenience prediction metric engine can comprise determining a first set of sensors that is available for the transaction. This is performed in this embodiment by sending a request for an available sensor list from the server 902 to the mobile phone processor 906 and to the processor in the PC 107.

A second component or operation of the convenience prediction metric engine can comprise determining on server 902 an individual convenience metric for each sensor based on sensor usability parameters that may be stored in the database 903.

A third component or operation of the convenience prediction metric engine can include determining a prediction of a total convenience metric on server 902 based on the activity pattern models of the user and sensors, the computed individual convenience metrics of a subset of the available sensors, and the outputs of at least one of the sensors acquired prior to the time of the transaction. In some embodiments, a component of the activity pattern models for the sensors may be sensor performance models. The sensor performance models may comprise device-specific metrics such as false accept and false reject rates for any user, as well as specific performance metrics corresponding to each individual user. For example, metrics may include the quality of an acquired biometric image quantified by an image focus measure, the match score of the user's biometric image when compared to their reference biometric image, or may be the time that the user takes to use the sensor. The sensor performance models may impact the prediction of the total convenience metric in several ways. For example, if the user habitually takes a long time to use a particular sensor due to lack of familiarity or poor enrollment imagery for example, then the convenience metric corresponding to the sensor for that particular user may be updated to reflect the increased inconvenience, so that the system automatically selects alternate sensors for use in the transaction for that particular user.

A fourth component or operation of the convenience prediction metric engine can include determining on server 902 an optimal total convenience metric for the transaction using at least the prediction of the total convenience metric.

A fifth component or operation of the convenience prediction metric engine can include the selection on server 902 of an optimal subset of the first set of sensors for the transaction based on the optimal total convenience metric.

A sixth component or operation of the convenience prediction engine can include sending a list of the subset of the first set sensors from server 902 to the phone processor 906 or the PC 107.

A seventh component or operation of the convenience prediction engine can include the acquisition of the sensor data from the subset of the first set of sensors controlled by phone processor 906 or the PC 107. The outputs of the sensors are sent from the phone processor 906 or the PC 107 to the server 902.

An eighth component or operation of the convenience prediction engine can include determining an authorizing signal for the transaction on server 902 based on at least the prediction of the total convenience metric and the acquired sensor data.

In this example, the determination of the authorization signal may be fed from server 902 via local server 901 to the processor inside the PC 107 next to the point of sale terminal 108, and an authorization control module 906 sends the signal to a transaction enable/disable module 907 in the point of sale terminal 108 to enable or disable the transaction.

In another example where the transaction is performed on a mobile device (e.g., a mobile phone), the result of the convenience prediction engine implemented on the server 902 is transmitted over the wireless network to the processor 906 of the mobile device, and subsequently to an authorization control module 905 within the processor to enable or disable the transaction on the mobile device.

Figure 11:
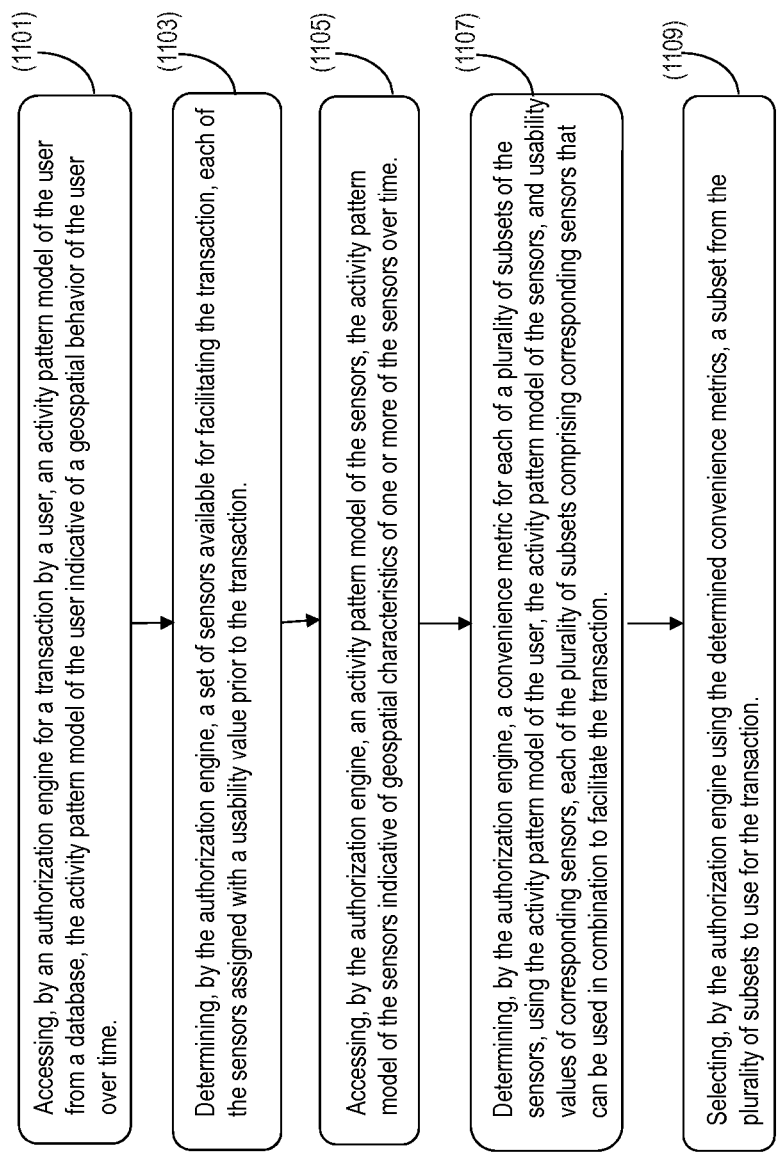
FIG. 11 is a flow diagram illustrating a method of predicting an optimal convenience metric for authorizing transactions, according to some embodiments.

Referring now to FIG. 11, one embodiment of a method for authorizing a transaction is depicted. The method can include accessing, by an authorization engine for a transaction by a user, an activity pattern model of the user from a database, the activity pattern model of the user indicative of a geospatial behavior of the user over time (1101). The authorization engine may determine a set of sensors available for facilitating the transaction, each of the sensors assigned with a usability value prior to the transaction (1103). The authorization engine may access an activity pattern model of the sensors, the activity pattern model of the sensors indicative of geospatial characteristics of one or more of the sensors over time (1105). The authorization engine may determine a convenience metric for each of a plurality of subsets of the sensors, using the activity pattern model of the user, the activity pattern model of the sensors, and usability values of corresponding sensors, each of the plurality of subsets comprising corresponding sensors that can be used in combination to facilitate the transaction (1107). The authorization engine may select, using the determined convenience metrics, a subset from the plurality of subsets to use for the transaction (1109).

Referring now to 1101, and in some embodiments, an authorization engine accesses, for a transaction by a user, an activity pattern model of the user from a database. In certain embodiments, an authorization engine comprises one or more of an authorization control module 906, a transaction enable/disable module, local server 901, server 902 and/or a convenience metric prediction engine, for example as described above in connection with at least FIGS. 8 and 9. The authorization engine may include one or more one or more elements residing on one or more devices, such as local server 901, server 902, PC 107, and/or mobile phone 101. Each of these devices may comprise elements of a computing device, for example as described above in connection with at least FIGS. 1B and 1C.

The activity pattern model of the user may be stored and/or maintained in a database 903, which may comprise a central database (e.g., for the processing system referenced in FIG. 9), or a distributed database. In some embodiments, the database 903 and/or the activity pattern model (or a copy thereof) is located or maintained at a point of transaction. The authorization engine may access the activity pattern model of the user from a remote database responsive to a determination that the activity pattern model is not available at a point of transaction, or that the model has expired. The authorization engine may access the activity pattern model of the user responsive to a transaction, e.g., responsive to the user initiating a transaction (e.g., at a point of sale terminal 108 and/or a mobile phone 101). The authorization engine may access the activity pattern model of the user in anticipation of a transaction by the user. For example, the authorization engine may access the activity pattern model responsive to determining that the user is proximate to, or has entered a retail establishment. The authorization engine may access the activity pattern model of the user responsive to the user's identity (e.g., the user's purported identity).

In some embodiments, the activity pattern model of the user may be indicative of a geospatial behavior of the user over time. For instance, the user model may describe or provide an indication of physical or geographical spatial relationship of the user with time, e.g., that the user is at a first location at time t1 and at a second location at time t2. In certain embodiments, the user model may describe or provide an indication of activities and/or transaction of the user in relation to location and/or time. For instance, the user model may record and/or describe that the user performed a purchase and/or accessed an electronic wallet at time t3 at a retail business located at a third location, after leaving the user's place of work at time t4, paying for subway fare at time t5 and arriving at the retail business at time t6.

Referring now to 1103, and in some embodiments, the authorization engine determines a set of sensors available for facilitating the transaction. The authorization engine may identify, locate or otherwise determine any type or form of sensors described above for example in connection with FIGS. 2B, 3, 4 and 9. The authorization engine may perform discovery, monitoring or detection of sensors available at the point of transaction, or for the transaction. For example, the authorization engine may access cached or stored information (e.g., available at the point of transaction) regarding available sensors. In some embodiments, the authorization engine communicates (e.g., via a mobile phone using cellular, bluetooth communications, etc.) with one or more sensors in the vicinity of the point of transaction, to determine availability of a corresponding sensor. The authorization engine may perform discovery, monitoring or detection of sensors that are operable and/or available to the user to facilitate the transaction. In certain embodiments, the authorization engine communicates with a first sensor that determines or senses if other sensor(s) are available for facilitating the transaction.

In some embodiments, the authorization engine determines the set of available sensors in response to any one or a combination of: the user initiating the transaction, or an anticipated transaction based on user location and/or past user behavior. The authorization engine may have access to one or more sensors residing on the same device (e.g., mobile device or point of sale terminal) as the authorization engine.

Each of the sensors may be assigned with a usability value prior to the transaction. The usability metric may indicate or represent a usability, convenience and/or ease/difficulty of use of a corresponding sensor. In some embodiments, a usability value of a corresponding sensor is specific to a user and/or a type of transaction. The usability value of a corresponding sensor may be indicative of an expected, measured and/or calculated amount of user effort (e.g., number of steps and/or amount of time expected to be spent) to provide input to the corresponding sensor. For example, a defective or unclean sensor may be assigned a usability metric that corresponds to an amount of user effort to provide useful or good quality input (such as biometric data) successfully to the sensor.

Referring now to 1105, and in some embodiments, the authorization engine accesses an activity pattern model of the sensors. The activity pattern model of the sensors may be indicative of geospatial characteristics of one or more of the sensors over time. The activity pattern model of the sensors may be stored and/or maintained in the database 903 or another database, which may comprise a central database (e.g., for the processing system referenced in FIG. 9), or a distributed database. In some embodiments, the database and/or the activity pattern model (or a copy thereof) is located or maintained at a point of transaction. The authorization engine may access the activity pattern model of the sensors from a remote database responsive to a determination that the activity pattern model is not available at a point of transaction, or that the model has expired. The authorization engine may access the activity pattern model of the sensors responsive to a transaction, e.g., responsive to the user initiating a transaction (e.g., at a point of sale terminal 108 and/or a mobile phone 101). The authorization engine may access the activity pattern model of the sensors in anticipation of a transaction by the user. For example, the authorization engine may access the activity pattern model responsive to determining that the user is proximate to the sensors, or has entered a retail establishment. The authorization engine may access the activity pattern model of the sensors responsive to determining the type of the transaction.

In some embodiments, the activity pattern model of the sensors may be indicative of a geospatial behavior of one or more sensors over time. For instance, the sensor activity model may describe or provide an indication of physical or geographical spatial relationship of a corresponding sensor with time, e.g., that the sensor (on a cellphone or in a car) is at a first location at time t1 and at a second location at time t2. In certain embodiments, the sensor activity model may describe or provide an indication of activities and/or transactions of the sensor in relation to location and/or time. For instance, the sensor activity model may record and/or describe that multiple attempts to use the sensor at times t1, t2 and t3 (e.g., by different users) failed to provide usable biometric data for authentication.

In some embodiments, the authorization engine assembles or combines multiple sensor activity models corresponding to multiple sensors, into a single activity model. In certain embodiments, the authorization engine accesses or generates a sensor activity model for a specific set or subset of sensors (e.g., for the set of sensors available for the transaction, and/or for possible subsets of the sensors for the transaction).

In some embodiments, at least one of the activity pattern model of the user or the activity pattern model of the sensors comprises a component that is static or predetermined. A static user model component may include known information of user's locations (e.g., geospatial coordinates and time) before the transaction. A static sensor activity model may include locations (e.g., geospatial coordinates and time) and/or outputs (e.g. biometric score, password values, etc.) of user-sensor interactions preceding the transaction in question. For example, the static component may be established based on past or historic activity of sensor(s) or user, and is predetermined prior to the time of the transaction.

Figure 6:
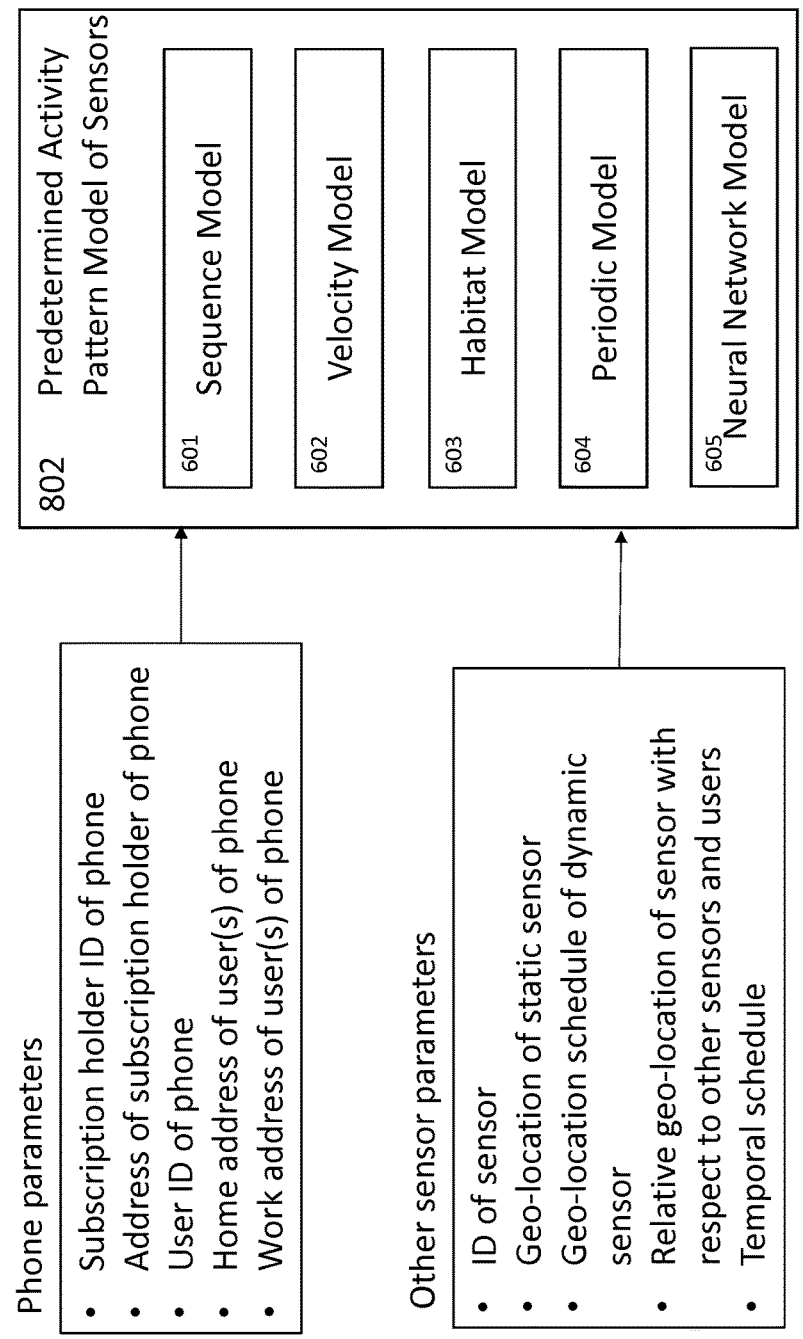
FIG. 6 is a block diagram indicating mobile device parameters, other sensor parameters and a pre-determined activity pattern model for the sensors, according to some embodiments.

In some embodiments, at least one of the activity pattern model of the user or the activity pattern model of the sensors comprises a component that is dynamically updated during part of the transaction. At least one of the user model or the sensor model may have a dynamically updated component. A model update engine 803, 804 may update a corresponding model based on new, current or updated input to the model update engine, new, current or updated measurements by a sensor, and/or new, current or updated output of a sensor, for instance. A dynamic model component may include information which is based on events that occur at the time of transaction. For instance, the information may include actual user location, and if user is offered to confirm his/her identity then the sensors' locations and outputs the user interacted may be incorporated into the dynamic component. For example, this is described above in connection with at least FIG. 8. In some embodiments, at least one of the activity pattern model of the user or the activity pattern model of the sensors comprises at least one of: a sequence model, a velocity model, a periodic model, a habitat model, or a neural network model, for example as described above in connection with FIGS. 5-7.

Referring now to 1107, and in some embodiments, the authorization engine determines a convenience metric for each of a plurality of subsets of the sensors. Each of the plurality of subsets may include corresponding sensors that can be used in combination to facilitate the transaction. The authorization engine may determine a convenience metric for each of a plurality of subsets of the available sensors that can facilitate the transaction (e.g., for the user). For instance, if is it determined that a first subset of sensors cannot operate to facilitate or authorize the transaction, a convenience metric prediction engine 805 of the authorization engine does not determine a corresponding convenience metric for that first subset.

The authorization engine may determine a convenience metric for each of the plurality of subsets using, or based on the activity pattern model of the user, the activity pattern model of the sensors, and/or usability values of corresponding sensors. The authorization engine may determine the convenience metric for each of the plurality of subsets using outputs, signals and/or indications of at least one of the sensors obtained prior to the transaction. The authorization engine may determine the convenience metric for each of the plurality of subsets using outputs, signals and/or indications of at least one of sensors obtained prior to the transaction, that is not in the determined set of available sensors. The authorization engine may determine the convenience metric for each of the plurality of subsets using outputs of at least one sensor different from sensors of the selected subset, obtained prior to the transaction. The authorization engine may determine the convenience metric for each of the plurality of subsets using a device-specific metric of at least one of the sensors, the device-specific metric comprising a false accept rate, a false reject rate or quality of acquired biometrics.

In some embodiments, the authorization engine may determine a prediction of a total convenience metric for the transaction based on the activity pattern models of the user and sensors, the individual convenience metrics of an subset of the first set of sensors, and the outputs of at least one second set of sensors acquired prior to the time of the first transaction. The first second may be different from the second set. In certain embodiments, the total convenience metric for the transaction comprises convenience metrics (e.g., that are separable) for one or more individual sensors and/or one or more individual subsets of the sensors. In some embodiments, the prediction of a total convenience metric comprises a ranking, list or sequence of convenience metrics for the subsets. In some embodiments, the authorization engine determines or selects an optimal total convenience metric for the first transaction using at least the prediction of the total convenience metric.

Referring now to 1109, and in some embodiments, the authorization engine selects, using the determined convenience metrics, a subset from the plurality of subsets to use for the transaction. In some embodiments, the authorization engine selects, using the prediction of the total convenience metric, a subset from the plurality of subsets to use for the transaction. In some embodiments, the authorization engine selects, using the convenience metrics of the subsets, a subset from the plurality of subsets to use for the transaction. In some embodiments, the selected subset of sensors may or may not include at least one biometric sensor.

In certain embodiments, the system or authorization engine determines an optimal convenience metric comprising one or more devices or processors configured to provide a convenience metric that maximizes an expected net benefit, or minimizes an expected net cost, over, or using data from, a plurality of transactions of the user over time, to a system that supports or enables the plurality of transactions. The authorization engine determines an optimal subset to select, corresponding to the optimal convenience metric.

In some embodiments, the authorization engine determines, for each of the plurality of subsets using a corresponding convenience metric, an expected income from authorizing the transaction. The authorization engine may select, using the corresponding convenience metrics, a subset from the plurality of subsets to use for the transaction. The selected subset may be determined to have an expected income that is higher than that of others of the plurality of subsets of sensors. In some embodiments, the expected income incorporates at least one of: a benefit or income from a correct determination to authorize the transaction, a potential loss due to an incorrect determination (e.g., of the user's identify) to authorize the transaction, or an expected loss of income (e.g., from losing the user as a customer).

It should be noted that certain passages of this disclosure can reference terms such as "first" and "second" in connection with devices, RATs, communication protocols, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method of authorization, the method comprising:
   accessing, by an authorization engine comprising one or more processors, for a transaction by a user, an activity pattern model of the user from a database, the activity pattern model of the user indicative of a geospatial behavior of the user over time;
   determining, by the authorization engine, a set of sensors available for facilitating the transaction, each of the sensors assigned with a usability value prior to the transaction;
   accessing, by the authorization engine, an activity pattern model of the sensors, the activity pattern model of the sensors indicative of geospatial characteristics of one or more of the sensors over time;
   determining, by the authorization engine, a convenience metric for each of a plurality of subsets of the sensors, using the activity pattern model of the user, the activity pattern model of the sensors, and usability values of corresponding sensors, each of the plurality of subsets comprising corresponding sensors that can be used in combination for the transaction; and
   selecting, by the authorization engine using the determined convenience metrics, a subset from the plurality of subsets for the transaction.

2. The method of claim 1, wherein the usability value of a corresponding sensor is indicative of an amount of user effort to provide input to the corresponding sensor.

3. The method of claim 1, wherein the selected subset of sensors includes a biometric sensor.

4. The method of claim 1, wherein at least one of the activity pattern model of the user or the activity pattern model of the sensors comprises a component that is dynamically updated during part of the transaction.

5. The method of claim 1, wherein at least one of the activity pattern model of the user or the activity pattern model of the tensors comprises at least one of: a sequence model, a velocity model, a periodic model, a habitat model, or a neural network model.

6. The method of claim 1, wherein determining the convenience metric for each of the plurality of subsets further comprises determining the convenience metric for each of the plurality of subsets using outputs of at least one of the sensors obtained prior to the transaction.

7. The method of claim 1, wherein determining the convenience metric for each of the plurality of subsets further comprises determining the convenience metric for each of the plurality of subsets using a device-specific metric of at least one of the sensors, the device-specific metric comprising a false accept rate, a false reject rate or quality of acquired biometrics.

8. The method of claim 1, wherein determining the convenience metric for each of the plurality of subsets further comprises determining the convenience metric for each of the plurality of subsets using outputs of at least one sensor different from sensors of the first set, obtained prior to the transaction.

9. The method of claim 1, wherein selecting the subset from the plurality of subsets to use for the transaction comprises:
   determining, by the authorization engine for each of the plurality of subsets using a corresponding convenience metric, an expected income from authorizing the transaction; and selecting, by the authorization engine, a subset from the plurality of subsets to use for the transaction, the selected subset determined with an expected income that is higher than that of others of the plurality of subsets of sensors.

10. The method of claim 9, wherein the expected income incorporates at least one of: a benefit or income from a correct determination to authorize the transaction, a potential loss due to an incorrect determination to authorize the transaction, or an expected loss of income from losing the user as a customer.

11. A system of authorization, the system comprising:
a set of sensors available for facilitating a transaction by a user, each of the sensors comprising an input sensing hardware interface:
    a database configured to store at least one of an activity pattern model of the user and an activity pattern model of the sensors; and
    an authorization engine comprising one or more processors, configured to:
        access, for a transaction, the activity pattern model of the user from the database, the activity pattern model of the user indicative of a geospatial behavior of the user over time;
        determine the set of sensors available for facilitating the transaction, each of the sensors assigned with a usability value prior to the transaction;
        access the activity pattern model of the sensors, the activity pattern model of the sensors indicative of geospatial characteristics of one or more of the sensors over time;
        determine a convenience metric for each of a plurality of subsets of the sensors, using the activity pattern model of the user, the activity pattern model of the sensors, and usability values of corresponding sensors, each of the plurality of subsets comprising corresponding sensors that can be used in combination for the transaction; and
        select, using the determined convenience metrics, a subset from the plurality of subsets for the transaction.

12. The system of claim 11, wherein the usability value of a corresponding sensor is indicative of an amount of user effort to provide input to the corresponding sensor.

13. The system of claim 11, wherein the selected subset of sensors includes a biometric sensor.

14. The system of claim 11, wherein at least one of the activity pattern model of the user or the activity pattern model of the sensors comprises a component that is dynamically updated during part of the transaction.

15. The system of claim 11, wherein at least one of the activity pattern model of the user or the activity pattern model of the sensors comprises at least one of: a sequence model, a velocity model, a periodic model, a habitat model, or a neural network model.

16. The system of claim 11, wherein the authorization engine is configured to determine the convenience metric for each of the plurality of subsets using outputs of at least one of the sensors obtained prior to the transaction.

17. The system of claim 11, wherein the authorization engine is configured to determine the convenience metric for each of the plurality of subsets using a device-specific metric of at least one of the sensors, the device-specific metric comprising a false accept rate, a false reject rate or quality of acquired biometrics.

18. The system of claim 11, wherein the authorization engine is configured to determine the convenience metric for each of the plurality of subsets using outputs of at least one sensor different from sensors of the first set, obtained prior to the transaction.

19. The system of claim 11, wherein the authorization engine is configured to select the subset from the plurality of subsets to use for the transaction, comprising:
    determining, by the authorization engine for each of the plurality of subsets using a corresponding convenience metric, an expected income from authorizing the transaction; and
    selecting, by the authorization engine, a subset from the plurality of subsets to use for the transaction, the selected subset determined with an expected income that is higher than that of others of the plurality of subsets of sensors.

20. The system of claim 19, wherein the expected income incorporates at least one of: a benefit or income from a correct determination to authorize the transaction, a potential loss due to an incorrect determination to authorize the transaction, or an expected loss of income from losing the user as a customer.

\* \* \* \* \*